United States Patent [19]
Sherman et al.

[11] Patent Number: 5,832,508
[45] Date of Patent: Nov. 3, 1998

[54] METHOD FOR DEALLOCATING A LOG IN DATABASE SYSTEMS

[75] Inventors: Andrew P. Sherman, San Francisco; Scott E. McCargar, San Anselmo, both of Calif.

[73] Assignee: Sybase, Inc., Emeryville, Calif.

[21] Appl. No.: 748,941

[22] Filed: Nov. 14, 1996

[51] Int. Cl.$^6$ .................................................. G06F 17/30
[52] U.S. Cl. ............................................................ 707/200
[58] Field of Search .................................. 707/1, 2, 3, 7, 707/8, 9, 10, 100, 101, 102, 103, 104, 200, 201, 202, 203, 204, 205, 206; 1/1; 711/130, 141, 162, 209; 395/182.13

[56] References Cited

U.S. PATENT DOCUMENTS

| | | | |
|---|---|---|---|
| 4,961,134 | 10/1990 | Crus et al. ................................... | 707/8 |
| 5,008,786 | 4/1991 | Thatte ...................................... | 711/162 |
| 5,155,678 | 10/1992 | Fukumoto et al. ...................... | 707/202 |
| 5,455,946 | 10/1995 | Mohan et al. ........................... | 707/202 |
| 5,493,668 | 2/1996 | Elko et al. ............................... | 711/130 |
| 5,537,574 | 7/1996 | Elko et al. ............................... | 711/130 |
| 5,717,919 | 2/1998 | Kodavalla et al. .............................. | 1/1 |

OTHER PUBLICATIONS

Gray, J. and Reuter, A., "*Transaction Processing: Concepts and Techniques,*" Morgan Kaufmann Publishers, Inc., 1993, pp. 493–524.

*Primary Examiner*—Thomas G. Black
*Assistant Examiner*—Ruay Lian Ho
*Attorney, Agent, or Firm*—John A. Smart

[57] ABSTRACT

A SQL database server system having an enhanced logging system is described. The logging system implements a "private log cache" (PLC) for reducing the contention on the system's "log" resource (which is protected by a log semaphore). An area of memory private to a user's task is set aside as a PLC—a cache where log records are built and stored before being posted to the log. Each PLC may hold multiple log records for a single transaction before they are flushed to the log (page chain) through the log semaphore. When a transaction commits or the memory fills with log records, the PLC associated with the transaction is flushed to the log. Also described is improved log deallocation methodology provided by the system which alleviates the needs to read each of the log pages to be deallocated, as was conventionally required. The operation to do the deallocation occurs at the allocation page, not at the individual pages (which are to be deallocated). In accordance with this method, the system writes a log record which includes the first page and the last page of the run (i.e., the number of those pages). The system need not, however, read any of the pages of the run, other than the first page and the last page. In a common case of a completely filled allocation unit, the system reads two pages—the first page and the last page—and writes one log record. As a result, the system reads far fewer log pages and writes but a single log record.

15 Claims, 36 Drawing Sheets

*DUMP SYNCHRONIZATION SEQUENCE*

| SQL SERVER | BACKUP SERVER |
|---|---|
| PHASE 1: | |
| PROHIBIT NEW DUMPS. (920) | |
| RECORD DUMP STARTRID. (922) | |
| SEND RPC("START DUMP") (924) ⟶ | BEGIN DUMPING |
| TRANSACTIONS PROCEED; BUILD (928) FLUSH LIST .... | ... DUMP I/O ... (926) |
| PHASE 2: ⟵ | RETURN("PHASE 1 DONE") (930) |
| BLOCK APPENDS TO FLUSH LIST; (932) MARK END OF FLUSH LIST. | AWAIT PHASE 2 RPC. |
| SEND RPC("PHASE 2", FLUSH_LIST...) (934) ⟶ | DUMP PAGES IN FLUSH LIST. |
| ... TASKS PROCEED EXCEPT APPENDERS TO FLUSH LIST... | ... DUMP I/O ... (936) |
| PHASE 3: ⟵ | RETURN("PHASE 2 DONE") (938) |
| SAMPLE DUMP INSTANT. (940) | AWAIT PHASE 3 RPC. |
| FLUSH THE LOG. | |
| DEACTIVATE FLUSH LIST AND AWAKEN APPENDERS. | |
| SEND RPC("PHASE 3") (946) ⟶ | DUMP PAGES IN LOG. |
| ... TRANSACTIONS ... | ... DUMP I/O ... |
| SAVE DUMP INSTANT IN DUMP TRAILER. ⟵ | RETURN("PHASE 3 DONE") |
| SEND RPC("WRITE DUMP TRAILER") ⟶ | WRITE DUMP TRAILER TO ARCHIVE. |
| PERMIT NEW DUMPS. ⟵ | RETURN("TRAILER WRITTEN") (950) |

METHOD FOR DEALLOCATING A LOG IN DATABASE SYSTEMS

The present application claims priority from and is a continuation-in-part of provisional application Ser. No. 60/025,880, filed Sep. 18, 1996 pending, the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to the process of logging transactions which are posted in a data processing system, such as a Database Management System (DBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level.

DBMS systems have long since moved from a centralized mainframe environment to a de-centralized or distributed environment. Today, one generally finds database systems implemented as one or more PC "client" systems, for instance, connected via a network to one or more server-based database systems (SQL database server). Commercial examples of these "client/server" systems include Powersoft™ clients connected to one or more Sybase SQL Server™ database servers. Both Powersoft™ and Sybase SQL Server™ are available from Sybase, Inc. of Emeryville, Calif. The general construction and operation of a database management system, including "client/server" relational database systems, is known in the art. See e.g., Date, C., *An Introduction to Database Systems,* Volume I and II, Addison Wesley, 1990; the disclosure of which is hereby incorporated by reference.

Traditionally, database management systems (e.g., the above-described client/server database systems) have been employed for on-line transaction processing (OLTP)—posting data from "transactions" to a database table. As part of this process, OLTP systems typically employ a logging system to log changes which occur to the system. In a commercial embodiment such as Sybase SQL Server System 11, this is done by posting log records to a transaction log. Every transactional operation, including inserts, updates, and deletes, causes a log record to be written to the transaction log or simply "log." In System 11, the transaction log is referred to as "syslogs." Each particular log record characterizes the change which has occurred to the database during processing of a transaction. This information can be used, for instance, in error recovery, to restore the database to a pre-existing, consistent state.

Consider a scenario where a transaction performs updates to a table but then the transaction "rolls back"—that is, aborts. In such a case, the system will undo the updates by reading backwards from the log and reversing the changes which were made (as a result of the updates). The recovery system of databases, therefore, employs the logging system and log records when performing the work of rolling back a transaction. In a similar fashion, the log can be used in the face of a failure, such as when a machine "crashes." As the log is read during recovery, some transactions are re-done on the one hand, while incomplete transactions are undone on the other. In addition to rolling back transactions and supporting error recovery, the log also provides an archive for the database, which documents the specific actions which have led to the current state of the database. All told, the log plays a critical part in the design and implementation of present-day relational database systems.

The logging system itself permits reading from and writing to the log. Write access is typically performed by "access methods" within a relational database system (i.e., a database system which presents data as tables or "relations"). In particular, these methods generate log records which describe actions occurring which affect the database. Read access, on the other hand, is generally provided by a recovery system within the database. In general, therefore, database system includes subsystems for writing log records into the log and, if needed, reading back those records.

A general description of the design and implementation of a logging system in a relational database is provided by Gray, J. and Reuter, A., *Transaction Processing: Concepts and Techniques,* Morgan Kaufmann Publishers, 1993, the disclosure of which is hereby incorporated by reference. For an overview of relational database systems, see the above-mentioned *An Introduction to Database Systems,* the disclosure of which has been previously incorporated by reference.

Each day more and more businesses are run from mission-critical systems which store information on server-based SQL database systems, such as Sybase SQL Server™. As a result, increasingly higher demands are being placed on server-based SQL database systems to "scale" with increased hardware resources—that is, as more sophisticated hardware (e.g., multi-processor units) becomes available, these systems should provide greater throughput.

The logging system of a database system presents a bottleneck to system scalability, however. This is because every insert, update, and delete operation must make a log entry to protect the database from corruption if a system failure or transaction rollback occurs. Most relational databases process a log entry for each update, insert, or delete statement, and each log entry is processed one at a time. When a log entry is written, the logging system must navigate through a synchronization point called the "log semaphore," which controls concurrent access to the log by multiple database transactions.

Because every transaction involves the logging system, its efficiency is paramount to transaction throughput. As scalability increases in a database system and transaction volume increases, the contention for logging resources—particularly the log "semaphore"—dramatically increases, resulting in reduced system throughput. What is needed are system and methods which preserve database throughput by reducing the contention which occurs for logging resources, even when such a system is scaled up with multiple database engines. The present invention fulfills this and other needs.

SUMMARY OF THE INVENTION

A SQL database server system having an enhanced logging system is described. The logging system implements a "private log cache" (PLC) for reducing the contention on the system's "log" resource (which is protected by a log semaphore). An area of memory private to a user's task is set aside as a PLC—a cache where log records are built and stored before being posted to the log. Each PLC may hold multiple log records for a single transaction before they are flushed to the log (page chain) through the log semaphore. When a transaction commits or the memory fills with log records, the PLC associated with the transaction is flushed to the log. Because the log records for a complete transaction are immediately transferred through the log semaphore, contention on the log semaphore is lowered. Contention alleviated by the PLC dramatically increases transaction throughput of the database server system.

Because log records can reside in a user or private log cache, the present invention also provides a mechanism for ensuring that such records are flushed (to the log page chain) before the corresponding data page is flushed. If a change which affects a data page is represented in a private log cache, a "PLC pin" for that page is instantiated to point to a corresponding PLC structure. When such a data page is written, the system first unpins the PLC pin, thus causing the corresponding PLC structure to be flushed to the log page chain. Now, the data page will get a pin to the log, for indicating where in the log records must be flushed in order to write the data page. The addition of the second pointer to the data page buffer provides a two-phase unpinning mechanism. Unpinning a page now requires that the corresponding private log cache (i.e., the one being pointed to by the pointer stored in the page) be first flushed to the log page chain. Secondly, the in-memory log itself is flushed to disk (up to the point in the log required for writing that data page).

In a preferred embodiment, the system of the present invention includes an improved data backup system which is especially suited to the backup of information stored in a large transactional database. The backup system is capable of backing up data while the transactional database is still active, and is capable of utilizing multiple backup archive devices to increase the speed at which a backup takes place. Additionally, the information to be backed up is processed through a calculation to determine stripe affinity, a method for ensuring the integrity of the database backups made to multiple backup devices simultaneously, while also permitting the reloading of data from fewer devices than used to make the original backup.

In such a system, the "archiving" part of a DUMP TRANSACTION command is done by the backup server. Here, the backup server copies the information which is in the log to an archive device (e.g., tape drive). The "deallocation" part of the command is performed by the SQL database server deallocating particular log pages. In the specific commercial embodiment of Sybase SQL Server, this task is carried out as follows. The SQL database server sends a "run list" of pages to the backup server. Since the log pages, like data pages, are divided up into allocation units, the run list represents a portion of an allocation unit. In the exemplary embodiment of SQL Server, an allocation unit comprises 256 pages. Of that unit, one page is designated as an "allocation page" (of that unit). The allocation page itself stores information describing which pages of the allocation unit had been allocated and deallocated. Each allocation unit can be further divided into extents. Extents, each which typically comprises eight pages, map to different objects. Within a data segment of a database, therefore, extents can map to different objects. Here, each extent is associated with no more than one object.

According to the present invention, log deallocation methodology is provided such that the system no longer needs to read each of the log pages to be deallocated, as was conventionally required. The operation to do the deallocation occurs at the allocation page, not at the individual pages (which are to be deallocated). In accordance with this method, the system writes a log record which includes the first page and the last page of the run (i.e., the number of those pages). A new log record type—LOGDEALLOC—is provided by the system for this purpose. This new log record is associated with information describing the first and last page of a run. The system need not, however, read any of the pages of the run, other than the first page and the last page. In a common case of a completely filled allocation unit, the system reads two pages—the first page and the last page—and writes one log record. As a result, the system reads far fewer log pages and writes but a single log record. In the instance where an allocation unit is not completely filled, the method is instead adapted to deallocate one extent at a time, thus still reading fewer pages and writing fewer log records. Here, the system reads two pages of the extent and writes a single log record. In prior approaches, in contrast, a database system would have read all eight pages of the extent and written eight log records for describing deallocation of each those pages. The approach of the present invention is particularly advantageous in a multi-user environment where writing numerous log records leads to increased contention for the system log, a shared resource.

BRIEF DESCRIPTION OF THE DRAWINGS

FIG. 9 is a chart listing a set of suitable backup phases performed in accordance with the instant invention.

DETAILED DESCRIPTION OF A PREFERRED EMBODIMENT

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment where optimization of logging performance is desirable, including non-SQL database management systems and the like. The description of the exemplary embodiments which follows is, therefore, for the purpose of illustration and not limitation.

Standalone System Hardware

Figure 1A:
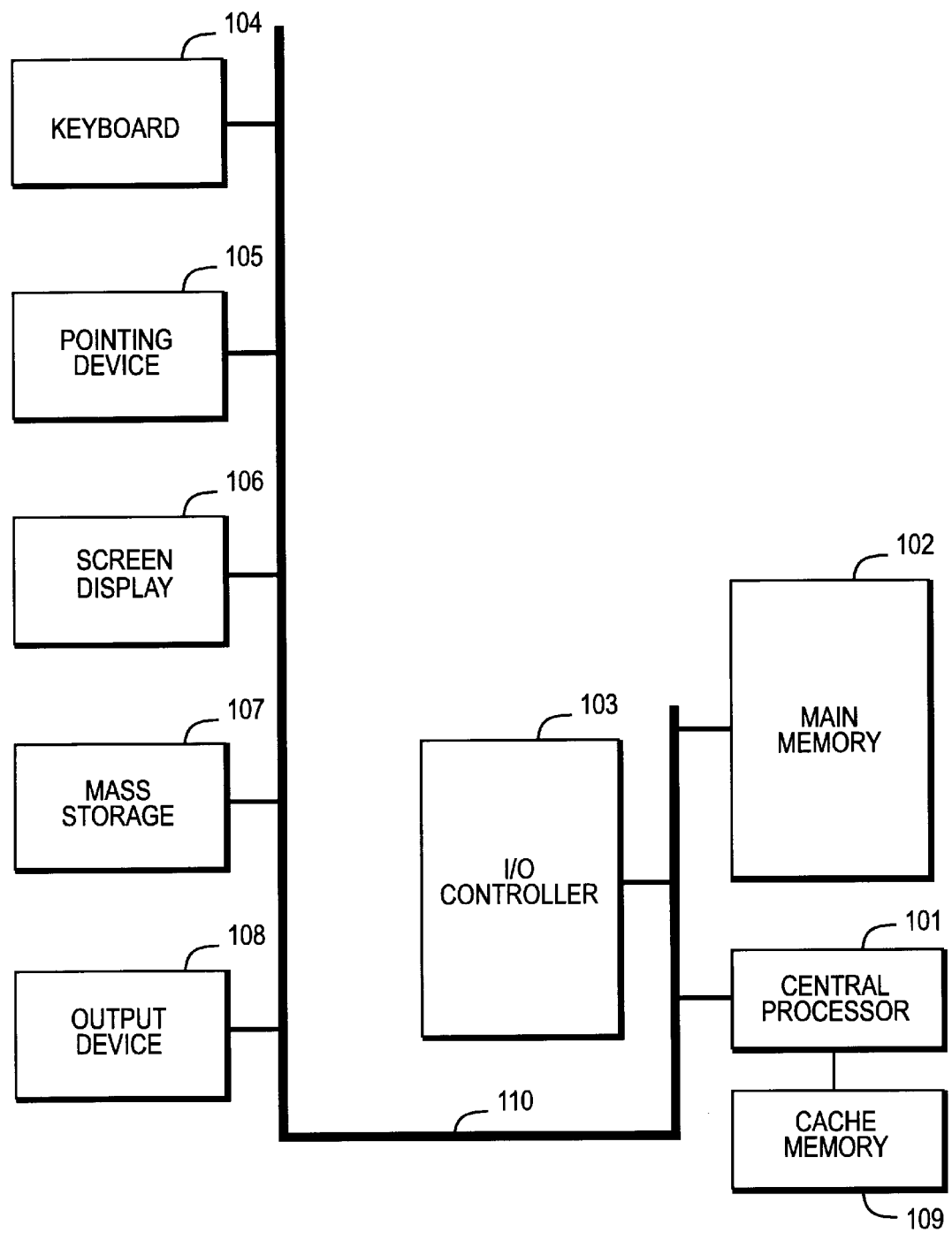
FIG. 1A is a block diagram illustrating a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a persistent or mass storage 107 (e.g., hard or fixed disk, removable or floppy disk, optical disk, magneto-optical disk, and/or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
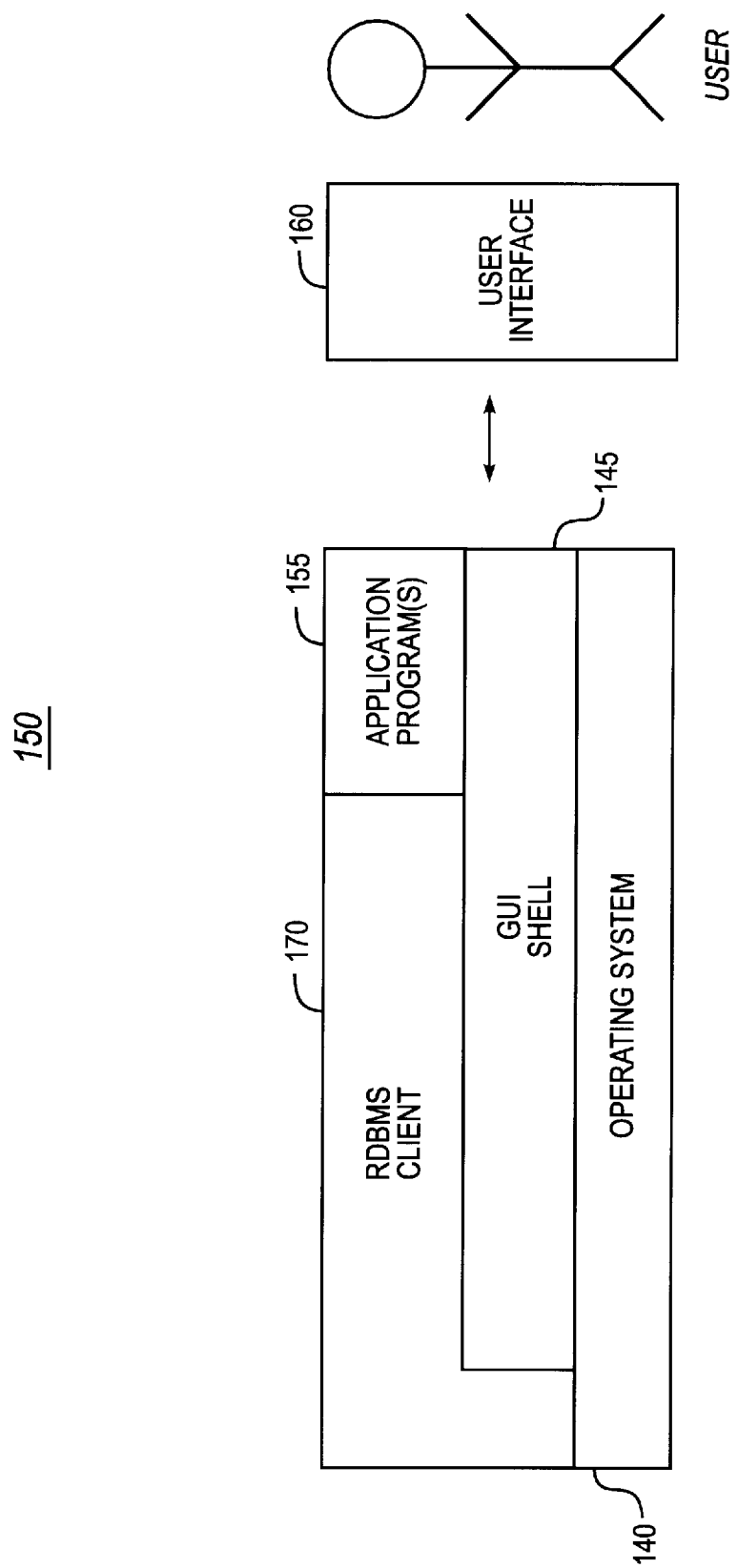
FIG. 1B is a block diagram illustrating a software subsystem for controlling the operation of the computer system of FIG. 1A.

Illustrated in FIG. 1B, a computer software system 150 is provided for directing the operation of the computer system 100. Software system 150, which is stored in system memory 102 and on disk memory 107, includes a kernel or operating system (OS) 140 and a GUI (graphical user interface) shell 145. One or more application programs, such as application software 155, may be "loaded" (i.e., transferred from storage 107 into memory 102) for execution by the system 100. The system also includes a UI (user interface) 160 for receiving user commands as input and displaying user data as output. Although shown as a separate component, the UI 160 is typically provided by the GUI operating under the control of the OS 140, program(s) 155, and Relational Database Management System (RDBMS) client 170. The RDBMS client or "front-end" 170 itself may comprise any one of a number of database front-ends, including PowerBuilder™, dBASE®, Paradox®, Microsoft® Access, or the like. In an exemplary embodiment, the front-end will include SQL access drivers (e.g., Borland SQL Links, or Microsoft ODBC drivers) for accessing SQL database server tables in a Client/Server environment.

Client/Server Database Management System

Figure 2A:
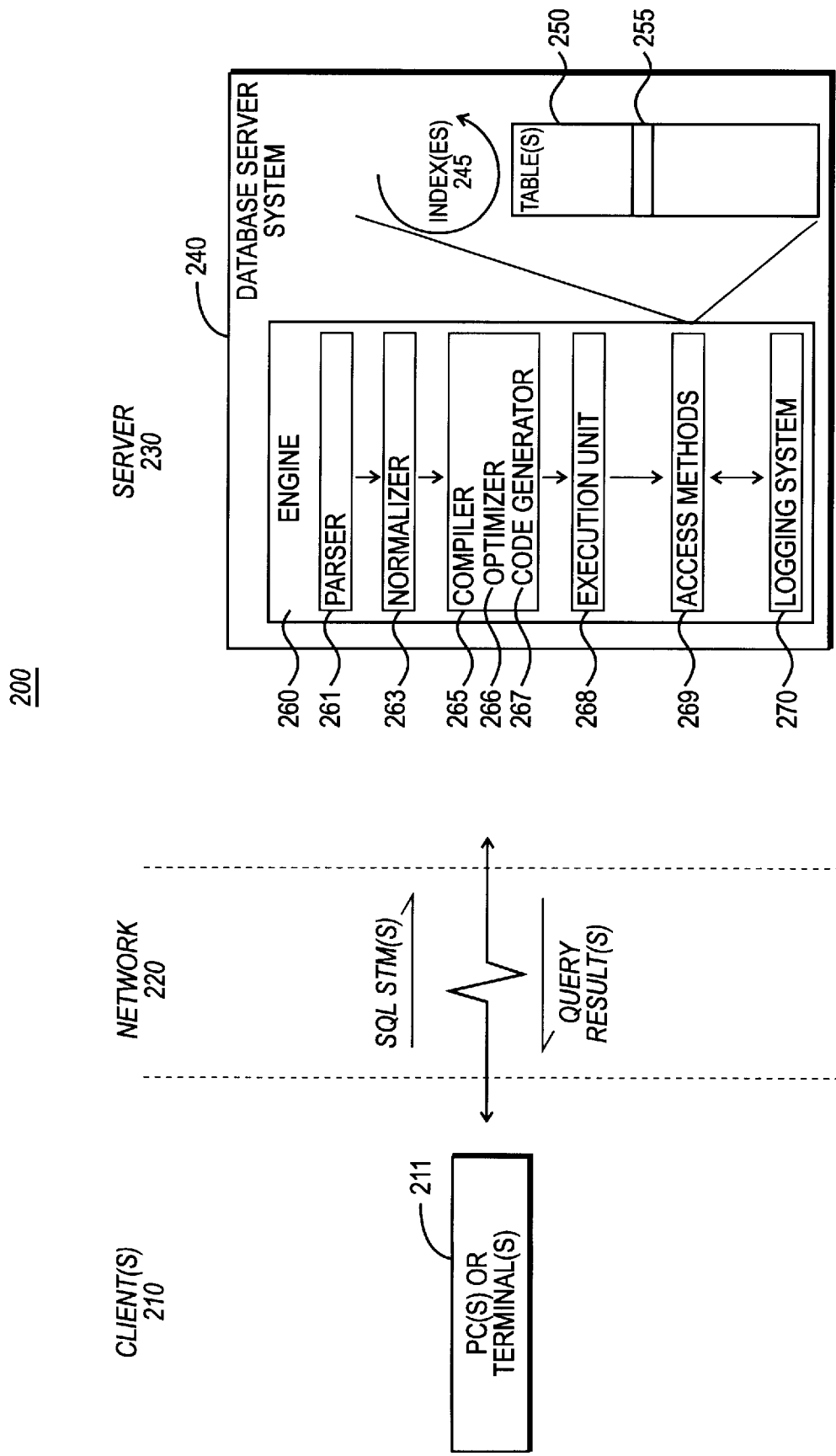
FIG. 2A is a block diagram of a client/server system in which the present invention is preferably embodied.

While the present invention may operate within a single (standalone) computer (e.g., system 100 of FIG. 1A), the present invention is preferably embodied in a multi-user computer system, such as a client/server system. FIG. 2A illustrates the general structure of a Client/Server Database System 200 which is preferred for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQL Server™ (Sybase, Inc. of Emeryville, Calif.) in an exemplary embodiment, generally operates as an independent process(es) (i.e., independently of the clients) running under a server operating system such as Microsoft Windows NT (Microsoft Corp. of Redmond, Wash.), NetWare (Novell of Provo, Utah), or UNIX (Novell). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client SQL calls and its parameters into a format (of one or more packets) suitable for transmission across a cable or wire, for delivery to the Database Server 240.

Client/server environments, database servers, and networks are well documented in the technical, trade, and patent literature. For a general discussion of database servers and client/server environments, see, e.g., Nath, A., *The Guide to SQL Server,* Second Edition, Addison-Wesley Publishing Company, 1995. Additional documentation of SQL Server™ is available from Sybase, Inc. as *SQL Server Documentation Set* (Catalog No. 49600). For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using NetWare,* Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the Client(s) 210 store data in or retrieve data from one or more database tables 250, shown in FIG. 2A. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

During a database session or "connection" with the Server, each Client issues one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned *An Introduction to Database Systems.* In addition to retrieving the data from Database Server tables, the Clients also include the ability to insert new rows of data records into the table; Clients can also modify and/or delete existing records in the table.

During system operation, the SQL statements received from one or more Clients 210 (via Network 220) are processed by Engine 260 of the Database Server System 240. The Engine 260 itself comprises a Parser 261, Normalizer 263, Compiler 265, Execution Unit 268, Access Methods 269, and Logging System 270. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods being invoked during query execution.

The Code Generator 267, on the other hand, converts the query tree into a set of instructions suitable for satisfying the query. These instructions are passed to the Execution Unit 268. Operating under the control of these instructions, the Execution Unit 268 generates calls into lower-level routines, such as the Access Methods 269, for carrying out the query-specified operation, such as fetching relevant information (e.g., row 255) from the database table 250. After the plan has been executed by the Execution Unit, the Server returns a query result or answer table back to the Client(s).

For enhancing the speed in which the Database Server stores, retrieves, and presents particular data records, the Server maintains one or more database indexes 245 on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file. As clients insert more and more data into a particular one of the table(s) 250, a corresponding one of the index(es) 245 continues to grow.

As transactions are processed by the system, Logging System 270 is used to log changes which occur to the system. In the commercial embodiment of Sybase SQL Server System 11, this is done by posting log records to a transaction log. Every transactional update to an object, including inserts, updates, and deletes, causes a log record to be written to the transaction log or simply "log." In SQL Server, the transaction log is referred to as "syslogs." Each particular log record characterizes the change which has occurred to the database during processing of a transaction. This information can be used, for instance, in error recovery, to restore the database to a pre-existing, consistent state.

The Logging System 270 will now be described in further detail. In particular, the description will focus on improved methods of the present invention for logging transactions. Improved transaction logging

A. Introduction

Since a log is a shared resource in a multi-user database system, much contention exists for the log, as multiple users desire concurrent access to the log for performing transactions. At the same time, a system must control access to the log for preventing one user from overwriting the results of another user.

The semaphore is employed for controlling access to the log. Often, a dedicated semaphore—a "log semaphore"—is employed for this purpose. The semaphore locks access to the system log table(s) so that a particular task can post log entries, as necessary, without interference from another concurrent task. Such an approach, however, presents a pronounced bottleneck to scalability. Each transaction which wants to write a log record must build the record on its stack, take out the log semaphore, and copy the log record into the page chain (where the log is currently being appended to).

The log itself exists in two versions: an in-memory version and a disk version. The in-memory version of the log exists as a page chain in system memory. Here, data pages storing log records are linked together in memory to form a chain of pages. The in-memory log is flushed, at appropriate times, to disk, for creating the disk version of the log. In typical operation, when a transaction "commits," the log records must first be written to disk before the database system proceeds with actually committing the transaction. "Write-ahead logging" is a rule in the database server governing how a data page (buffer) and its corresponding log records are written to disk. Succinctly stated, the rule dictates that a data page cannot be written to disk until the log records describing the change to that page have been (previously) written to disk. A given transaction will even "sleep" while waiting for its log records to be written to disk. Therefore, the log records must go to disk before the data pages.

Write-ahead logging is implemented by using a "pinning" mechanism. Each data page is associated with a context buffer storing housekeeping information for a data page, including a "log pin." The log pin is a pointer which points to the place in the log indicating up to where in the log the log must be flushed to disk before the data page itself can be written to disk. Until these log records are written to disk, the data page is "pinned" to the in-memory log (i.e., log page chain).

Complementing the notion of pinning is "unpinning." Consider a scenario where a database server's buffer manager desires to write a pinned buffer to disk (e.g., write the page to disk, according to a least-recently used scheme). Before the buffer manager can write that page to disk it should preferably "unpin" the page. As dictated by the write-ahead logging rule, this "unpinning" causes part of the log to be flushed to disk.

Figure 2B:
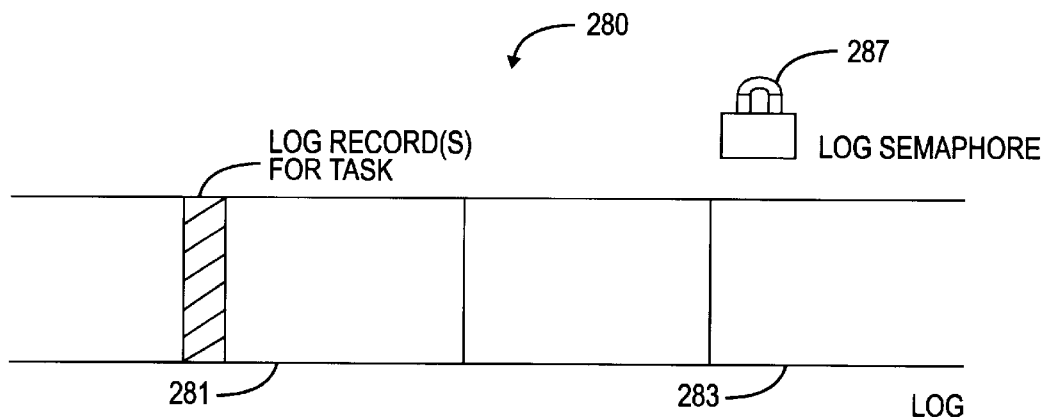
FIG. 2B is a simplified block diagram summarizing data structures conventionally employed for logging transactions.

FIG. 2B provide a simplified diagram summarizing the data structures employed for logging. As shown in FIG. 2B, the system log or "syslogs" comprises an in-memory page chain 280 including, for instance, log page 281 and log page 283. To post log records to the syslogs, a task must take out the log semaphore 287. In particular, as each record is appended to the syslogs, at log page 281, the log semaphore 287 is held. Without further improvement to the logging system, much contention would exist among the various tasks for the log. To provide improved scalability, therefore, one must solve the problem of contention for the log semaphore.

One approach to solving contention for a resource is to split up the resource. For a logging system, for instance, it is possible to employ multiple semaphores guarding different parts of the log. In general, however, a log is a structure where log records are appended to one end. Protecting the log structure with multiple semaphores would require multiple insertion points into the log. As readers of the log, such as recovery systems, rely on the log being sequential (e.g., for "playback" of log records), adding multiple insertion points leads to greater complexity in processing and maintaining the log. Quite simply, destroying the sequential nature of the log would convert it from a simple, easy-to-maintain structure to one which is far more complicated—one requiring complex processing at multiple subsystem levels other than that of the logging system (e.g., such as in the error recovery system). Since the sequential nature of the log is a fundamental property which is highly desirable to preserve, therefore, an approach employing multiple log semaphores is not attractive.

Another approach would be for a task to take out a log semaphore but not, at that point, copy the log record into the log. Instead, the task would simply reserve a space in the log structure, which would eventually receive a copy of the log record. Here, the semaphore is not held while copying but, instead, is only held for reserving a space—typically, a much shorter time period. The approach is not without problems, however. In particular, the approach creates "holes" in the log structure. Each hole represents a reserved space in the log which has yet to receive a log record. The approach leads to increased complexity in design and maintenance of the log since additional processing is required for correct treatment of "holes," for instance, during transaction roll back or error recovery.

B. "Private Log Caches"

1. Overview

A logging system, constructed in accordance with the present invention, provides a plurality of user or "private" log caches (PLCs). Instead of a task writing log records into the log page chain, the task instead buffers the log records in system memory. When the task needs to either flush that cache or commit the transaction, the system flushes the log records to the log page chain. At that instance, the task takes out the log semaphore and copies all the log records from the private log cache into the system log. Using this approach, each task requires the log semaphore much less frequently, since the semaphore is only needed at the point where log records are flushed from the private log cache to the log page chain.

Figure 2C:
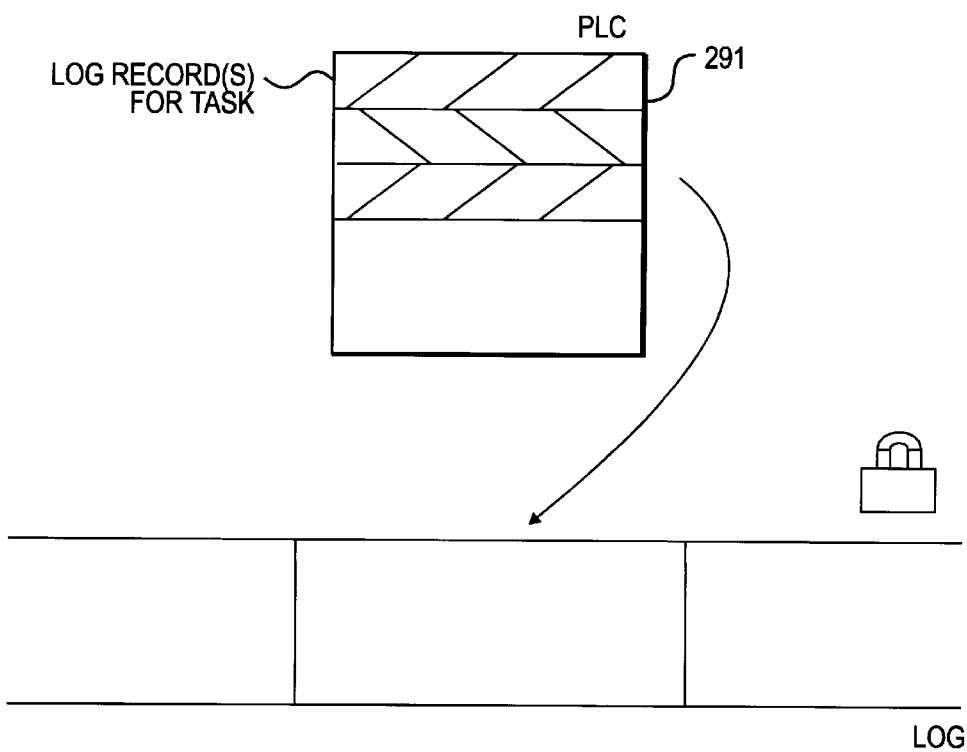
FIG. 2C is a simplified block diagram illustrating improved data structures employed in the system of the present invention for logging transactions.

FIG. 2C provide a simplified diagram illustrating the improved data structures employed for logging in the system of the present invention. As shown, each task writes a generated log record to its own "private log cache"—a region of memory reserved for the particular database connection or "user." For instance, the task first writes its log records to private log cache 291. The log semaphore, shown as 291, is not held by the task during this process. Only when the private log cache for a task needs to be flushed to the actual log is the log semaphore taken out by a task. In instances where a page can be concurrently updated without a transactional lock (e.g., OAM (Object Allocation Map) pages in Sybase SQL Server), the PLC containing log record(s) describing a change to such a page are flushed before the end of the transaction. In either instance, the approach of the present invention greatly reduces contention for the log semaphore.

A consequence of this approach is that log records tend to be much more grouped together. In other words, the log records for a given task or connection will tend to be grouped together as they are flushed as a group from the private log cache of a task to the log page chain. What is important to note, however, is that the sequence of the log records is preserved on a per transaction basis.

2. Improved Logging Data Structures

Figure 3A:
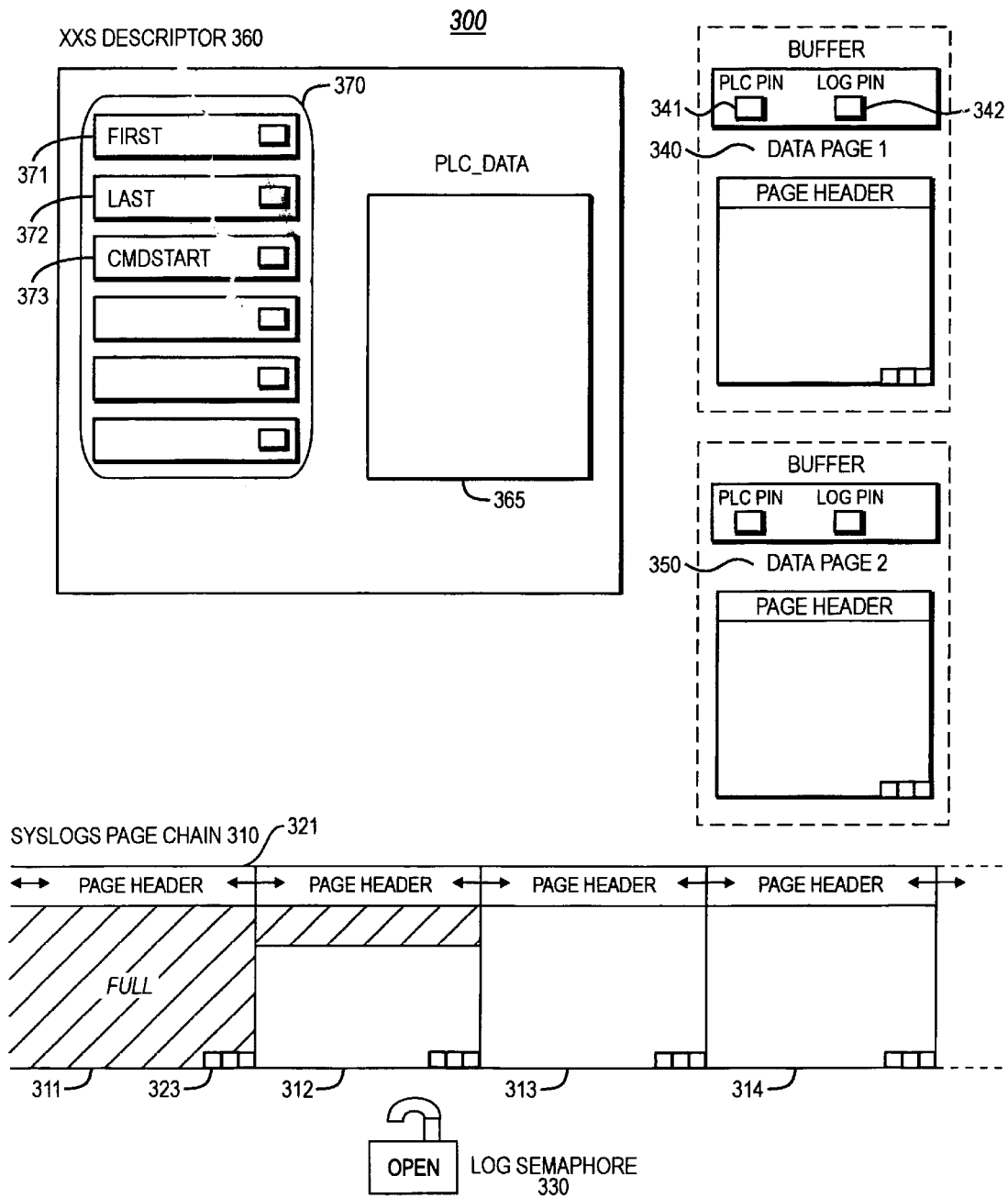
FIG. 3A is a detailed block diagram illustrating improved data structures employed by the system of the present invention for logging transactions.

Before describing internal methods of operation for the system, it is first helpful to examine in further detail the core data structures employed by the system. FIG. 3A illustrates logging data structures 300, which interact during system operation. The data structures include a syslogs page chain 310—a representation of the log in system memory. The page chain itself is comprised of individual pages, such as pages 311, 312, 313, and 314. As shown, each page includes a page header (e.g., page header 321 for page 311) which stores housekeeping information for its page. Also shown, each page stores forward and backward pointers for referencing previous and next neighbors in the page chain. Each page also includes a directory or row lookup 323 for locating the particular offset in the page where a given record (identified by row number) is located. Access to the page chain, which is globally shared, is provided through log semaphore 330. By reducing contention for the log semaphore 330, system scalability improves.

The right hand side of FIG. 3A illustrates two data pages: data page 1 (340) and data page 2 (350). Each data page is associated with a buffer data structure which stores information for supporting the in-memory image of the page. Although shown together, a data page image and its corresponding buffer data structure do not necessarily reside in contiguous portions of memory. The information stored by the buffer structure is relevant only when the data page resides in-memory (as opposed to on-disk). Information which is relevant includes, for instance, a PLC pinning flag (e.g., pin 341) as well as a log pinning flag (e.g., pin 342).

The logging data structures 300 also include a transaction logging descriptor (XXS) 360. In an exemplary embodiment, this data structure is linked (via a pointer) to a transaction descriptor (xdes) data structure which completely characterizes a transaction. Implementation of an xdes data structure is described in commonly-owned, co-pending application Ser. No. 08/537,020, filed Oct. 2, 1995, the disclosure of which is hereby incorporated by reference. The XXS data structure, on the other hand, may be constructed as follows (using the C programming language).

```
/*
** XXS - XLS Session descriptor
*/
typedef struct xxs
{
    /* Link for active transaction list - MUST BE FIRST */
    LINK    xxs_activelist;
    /* External data to XLS - none */
    /* Internal data */
    /*
    ** This set remain constant once the XXS object
    ** is attached to the XDES object.
    */
    struct xdes    *xxs_xdes;   /* Pointer to attached XDES */
    struct pss     *xxs_pss;    /* Pointer to task's PSS
                                ** (housekeeping) */
    PLCSTATE       *xxs_plc;    /* Pointer to task's PLC */
    /*
    ** This set remain constant during a transaction.
    */
    struct dbtable    *xxs_dbt;    /* Database for transaction */
    /*
    ** This set varies over the life of a transaction.
    */
    struct sdes       *xxs_syslogs_xact;  /* SDES for SYSLOGS for xacts */
    uint32            xxs_state;   /* State of XLS session */
    int               xxs_plclrn;  /* LRN id of first lr in PLC */
    int               xxs_count;   /* Total number of lr's written */
    circ_long         xxs_flushseq; /* Current dirty seq. for flush */
    int               xxs_error;   /* Error for last failure */
    struct sdes       *xxs_syslogs_scan;  /* SDES for SYSLOGS for SCANs */
    XLSCAN            *xxs_scan;   /* Current scan structure */
    uint32            xxs_reqmarkers;
    uint32            xxs_nlreqmarkers;
    XLRMARKER  xxs_markers [XLSM_NUM_MARKERS];
}XXS;
```

The XXS data structure references a private log cache data structure or "PLC object," as shown at 365. This controls the region in memory where the log records are actually cached. In an exemplary embodiment, the PLC object (an object of type PLCSTATE) may be constructed as follows.

```
/*
**  PLCSTATE - PLC object
**
**  The PLCSTATE holds the state information for the PLC itself.
**  Each PLCSTATE owns one PLC_DATA object, which is where log records are
**  actually cached.
**
**  XXS <-> PLC synchronisation
**
**      plc_xkeeper -  Identifies the the XLS session (via the internal
**                     descriptor (XXS *)) that keeps the PLC. This field
**                     may only be changed by the task that owns
**                     the XLS session and only when holding the PLC
**                     lock.
**
**                     This means that the keeper of the PLC can read
**                     this field without any synchronisation. All other
**                     tasks must grab the PLC lock to see a stable value for
**                     this field.
**
**                     The PLC at any time is kept by at most one XLS session.
**                     If an XLS session does not have the PLC kept
**                     (plc_xkeeper is NULL), then there can be
**                     no log records in the PLC. The thread owning
**                     the PLC may avoid locking the PLC if the current XLS
**                     session does not have the PLC kept. The assumption
**                     is that other threads have no interest in the PLC
**                     when it is empty.
**
**      plc_lockcount Can only be read and modified under the PLC spinlock.
*/
typedef struct plcstate
{
        /* External data to XLS - none */
        /* Internal data */
        /*
        ** This set remain constant once the PLCSTATE object
        ** is attached to the PLC_DATA object.
        */
        struct   spinlock     *plc_spinlock;     /* Spinlock for PLC */
        BYTE     *plc_start;                     /* Start of PLC_DATA */
        BYTE     *plc_end;                       /* End of PLC_DATA */
        int      plc_maxpagecount;               /* Maximum number of
                                                 ** log pages required
                                                 ** to flush the PLC.
                                                 */
        /*
        ** This set is variable during the life of the PLCSTATE
        */
        int      plc_lockcount;        /* PLC semaphore count */
        int      plc_waiters;          /* # of waiters for PLC lock */
        int      plc_maxlength;        /* max len of next log rec */
        int      plc_count;            /* # of log records in PLC */
        int      plc_logspace_free;    /* number of bytes still
                                       ** reserved in log through
                                       ** the threshold manager.
                                       */
        /*
        ** plc_offset
        **
        ** if the PLC is not being flushed then plc_offset is the
        ** address where the next log record will be placed in the PLC.
        **
        ** Otherwise plc_offset is the address of the next log record
        ** to be removed from the PLC.
        */
        BYTE         *plc_offset;
        struct xxs   *plc_xkeeper;     /* Current XXS keeper of PLC */
        struct pss   *plc_locker;      /* Pss of task locking the PLC */
        struct syb_buf  *plc_bufhead;  /* Header of pinned buffer chain
*/
}PCSTATE;
```

Although the PLC is shown inside the XXS data structure, in a preferred embodiment the XXS data structure would instead store a pointer or handle referencing the PLC structure or object.

The XXS data structure 360 also stores or is associated with an array of transaction log record (XLR) markers 370. In a preferred embodiment, the array 370 comprises a fixed array (size=6) XLR markers. Each array entry, which serves as a pre-defined marker pointing to a particular part of the transaction, may be constructed from the following definitions.

3. Two-Phase "Pinning" And "Unpinning"

Recall that the "log pin" represents where in the log page chain log records must be flushed to disk before the corre-

```
/*
**   XLRMARKER - Log Record Marker - OPAQUE to XLS clients.
**
**   Clients of the XLS must not assume or have knowledge of
**   any of the below.
**
**   Internally a XLRMARKER has two formats, non-permanent and permanent.
**
**   In the non-permanent form the marker is the numeric
**   order of the log record with the first being XXS_LRN_FIRST (==1)
**   This is stored in u_xlr_marker.
**
**   In the permanent form the marker is the RID of the log record
**   (ie. once it has made it to the log page chain). This is stored
**   in u_xlr_rid.
*/
typedef    struct xlrmarker
{
    union
    {
        struct
        {
            pgid_t     fakepage;
            int32 u_xlr_marker;
        }s;
        RID   u_xlr rid;
    }u;
} XLRMARKER;
/* Markers stored in XXS */
#define    XLSM_FIRST   0        /* First log record of transaction */
#define    XLSM_LAST    1        /* Last log record of transaction */
#define    XLSM_CMDSTART    2       /* Client defined CMDSTART */
#define    XLSM_ABORTMARK   3       /* Client defined ABORTMARK i.e.
                                  ** a place in log to rollback to
                                  */
#define    XLSM_LASTSAVE     4       /* Client define LASTSAVE
                                  ** i.e. a savepoint in log to rollback to
                                  */
#define    XLSM_LASTINPAGECHAIN    5     /* Last log record added to page
chain */
#define    XLSM_NUM_MARKERS   6   /* Number stored in XXS */
/* Markers not stored in XXS */
#define    XLSM_SCAN    (-1)    /* Current log record of log scan */
#define    XLSM_OLDESTXACT  (-2)  /* Oldest active transaction */
#define    XLSM_LOGLAST      (-3)  /* Last log record in log page chain */
#define    XLSM_LOGFIRST     (-4)  /* First log record inlog page chain
*/
```

Client code refers to the markers by indexing into the array.

The first three markers are of particular interest to the present invention. The "first" XLR marker 371 points to the first log record associated with a transaction. In a corresponding manner, the "last" XLR marker 372 points to the last log record associated with the transaction. Finally, the "command start" XLR marker 373 points to the log record associated with the first data access/manipulation command of the current SQL statement (e.g., SQL INSERT command).

Figure 3B:
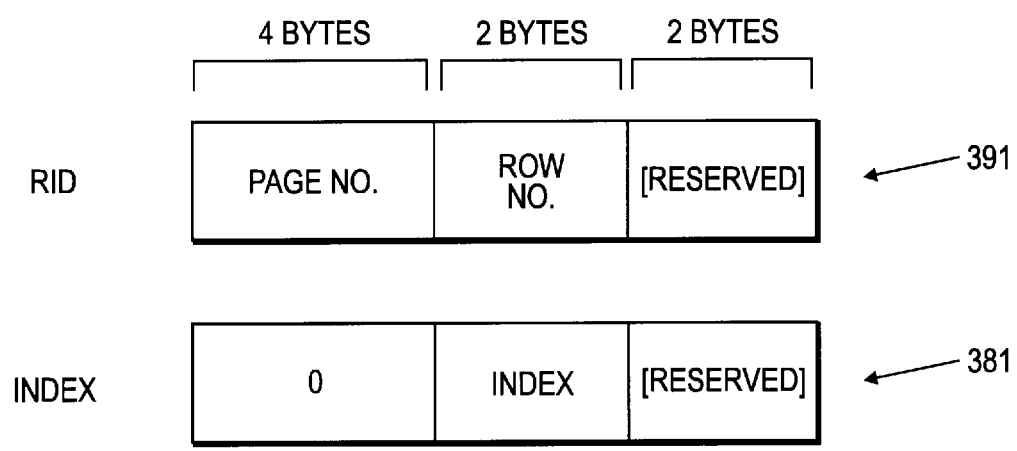
FIG. 3B is a block diagram illustrating a transaction log marker or XLRMARKER employed by the system of the present invention for tracking log records.

As indicated by the definition for XLRMARKER and illustrated in FIG. 3B, each XLR marker can take one or two forms. In a first form, the marker stores a pointer 381 to a log record while the log record is in a private log cache. In an alternative form, the marker stores a "RID"—a record ID—as shown at 391. In this latter form, the marker points to the log record in the page chain by referencing a particular ID of the page together with a row number on that page where the record is located. The index stored by pointer 381, on the other hand, simply is the ordinal number of the log record within the transaction; it is used to locate a record within the PLC.

sponding data page can be flushed. Besides this mechanism, the present invention introduces a second mechanism. Because log records can reside in a (user) private log cache (i.e., per "user" connection), a mechanism is needed to ensure that such records are flushed (to the log page chain). If a change which affects a data page is represented in a private log cache, the PLC pin for that page will be instantiated and will point to the corresponding PLC_DATA data structure (through the xdes data structure). In this manner, when such a data page is written, the system first unpins the PLC pin, thus causing the corresponding PLC_DATA data structure to be flushed to the log page chain. Now, the data page will get a pin to the log, for indicating where in the records must be flushed in order to write the data page. The addition of the second pointer to the data page buffer provides a two-phase unpinning mechanism. Unpinning a page now requires that the corresponding private log cache (i.e., the one being pointed to by the pointer stored in the page) be first flushed to the log page chain. Secondly, the in-memory log itself is flushed to disk (up to the point in the log required for writing that data page).

C. Methods Of Using Private Log Caches

Operation of the internal methods in the system of the present invention are perhaps best described by way of example. The following description will focus on various logging scenarios and describe changes which occur to the core data structures throughout these scenarios.

1. EXAMPLE #1

Figure 4A:
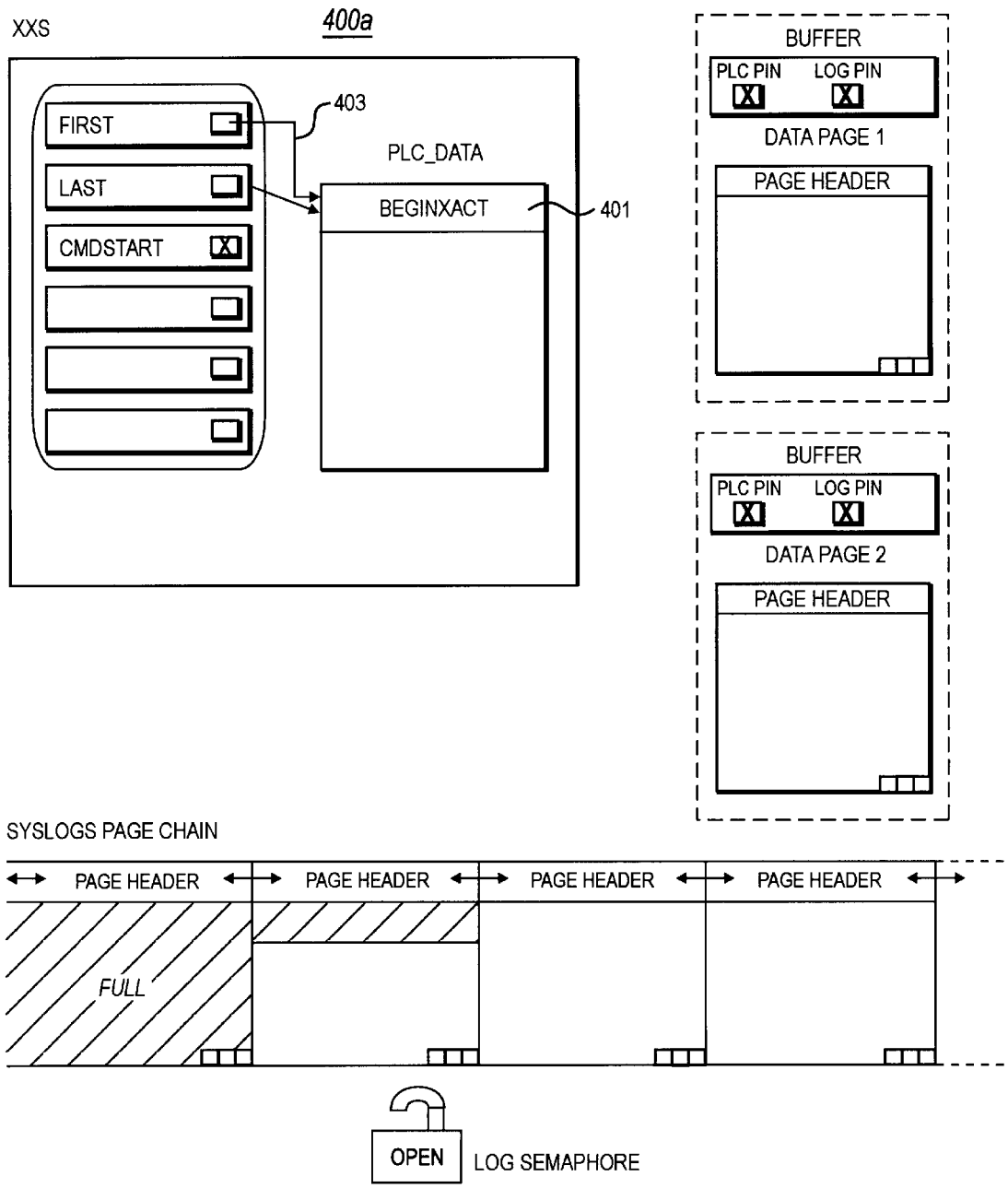
FIGS. 4A–E are block diagrams illustrating operation of the system of the present invention for logging a transaction which includes an INSERT operation affecting two data pages.

FIGS. 4A–E illustrate operation of the system for a transaction which includes an INSERT operation affecting two data pages. FIG. 4A represents the state of the logging data structures (400*a*) at the outset, when the transaction first begins (i.e., corresponding to the point of processing an SQL statement of BEGIN TRAN). Here, a "begin transaction" log record (BEGINXACT) is posted to the corresponding private log cache, as indicated at 401. Further, the "first" XLRMARKER is now instantiated to point or index into this first log record, as shown at 403. The "last" XLRMARKER also points at this record. Other pointers at this instance either point to themselves or store NULL values, as indicated by "X".

At the point in time indicated by FIG. 4A, no actual work has begun. Note that in contrast to prior systems, however, the truncation point in the log (page chain) is not tied up. Specifically, the "begin transaction" log record is not "sitting" in the log page chain but, instead, resides in the private log cache. Further, the system includes at this point an additional flag for indicating that no user data resides in the private log cache. If for some reason the cache needs to be flushed (e.g., because of another transaction), the system knows as a result of the flag that there is not useful user data to be flushed from the private log cache, since it only contains a single "begin transaction" record. In an exemplary embodiment, the flag is maintained by the XXS context descriptor data structure.

Figure 4B:
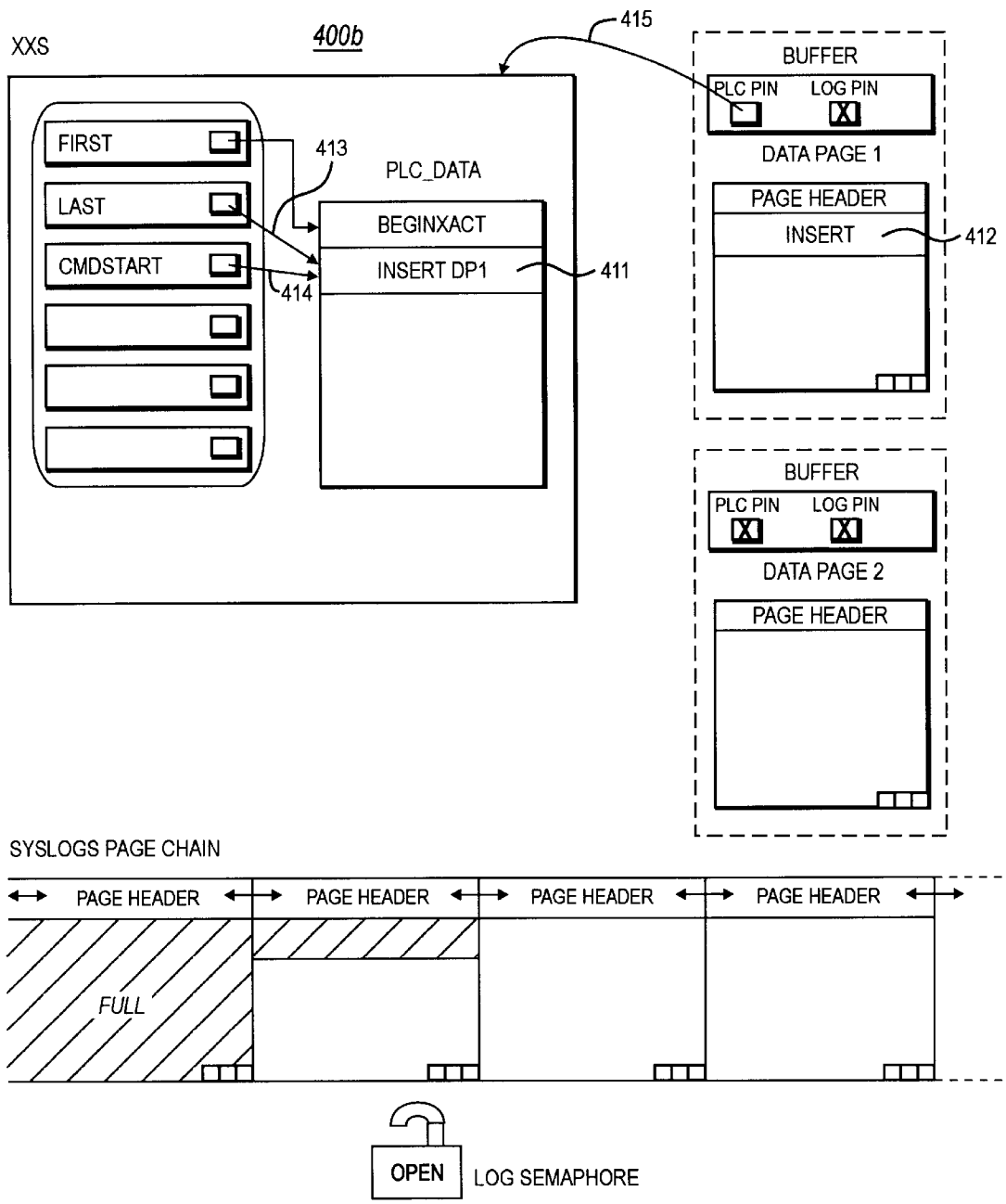
Figure 4C:
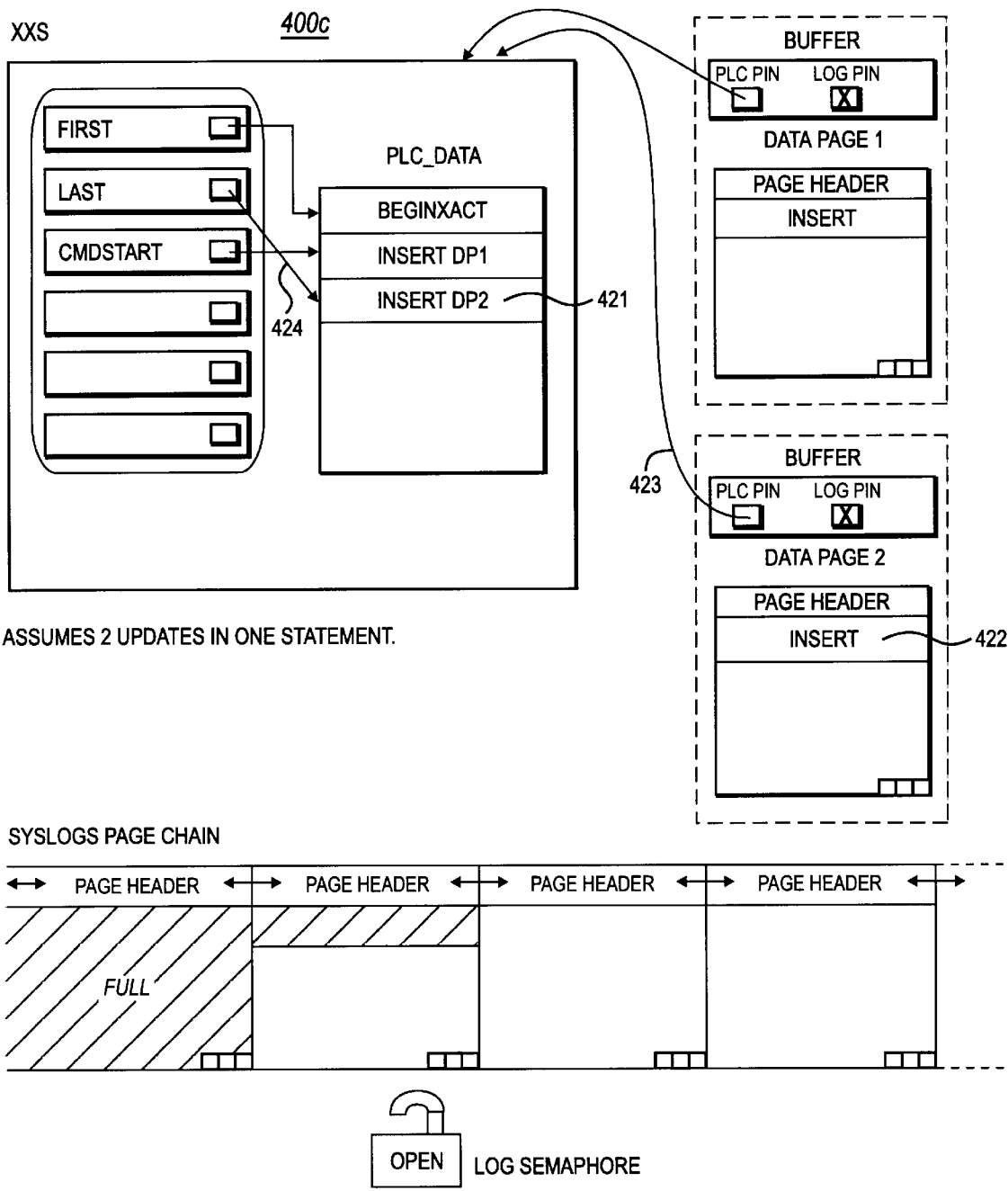

FIG. 4B illustrates a point in time when actual work has begun. For this example, the transaction has undertaken an INSERT (e.g., as a result of an INSERT SQL statement). The logging data structures, now illustrated as 400*b*, change as follows. A new log record, INSERT DP1, is appended to the private log cache, as shown at 411. This represents an "insert" log record which indicates that an INSERT operation is occurring at data page 1, as shown at 412.

Further, the "last" marker and the "command start" marker are instantiated as follows. The "last" marker now points to this newly-added log record, as indicated at 413. This last marker now indicates the last log record written by the transaction (at this point in time). At this point, the "command start" marker stores a pointer or reference to the INSERT log record as indicated at 414. The "command start" marker now also points to the newly-added log record, but for different reasons. Here, the log record indicates the start of a command statement, here, an SQL INSERT statement. This information is useful in the event that the system needs to roll back the statement: it can roll back the effects which have occurred to the start of the statement.

In addition to data being inserted into data page 1, the page is "pinned." Here, the PLC pin is instantiated to point to the private log cache, as indicated at 415. In the currently-preferred embodiment, the PLC pin stores a reference to the xdes data member which, in turn, stores a reference to the XXS data member which, in turn, pins the page to the PLC data structure.

Proceeding with the example, suppose an insert occurs on data page 2. This may occur, for instance, as a result of insertion of a data record having a key value which requires that the data record be stored on data page 2. This may occur, for instance, because of an existing clustered index requiring particular records to be inserted into particular data pages (based on key value). As a result, another "insert" log record is appended to the private log cache, as shown at 421 for log data structures 400*c*. This represents the insertion of data into data page 2, as indicated at 422. Data page 2 is now also "pinned" to the private log cache, as indicated at 423. Specifically, it stores a reference to the xdes data member which controls the XXS data member. Finally, the XLRMARKERs are updated by setting the "last" marker to point to the newly-added "insert" log record, as indicated at 424.

Figure 4D:
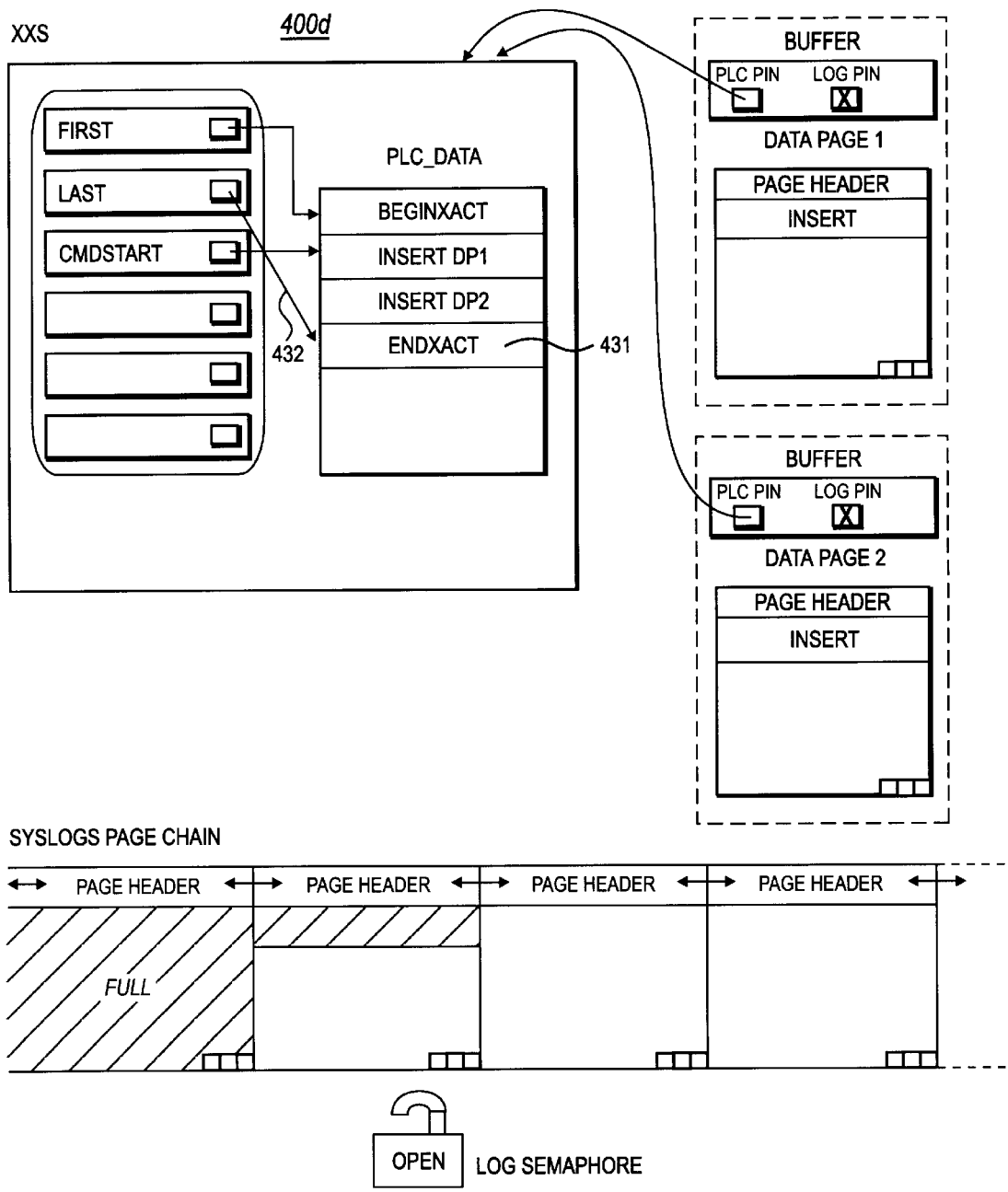

FIG. 4D illustrates the state of the data structures (now 400*d*) at the time when the transaction is to be committed (i.e., corresponds to SQL COMMIT statement). As shown, an "end transaction" record (ENDXACT) is appended to the private log cache, as shown at 431. Now, the "last" marker is updated to point to this newly-added log record, as indicated at 432. At this point, the user is trying to commit the transaction. For the system, this means that all the log records for the transaction must go to disk.

Figure 4E:
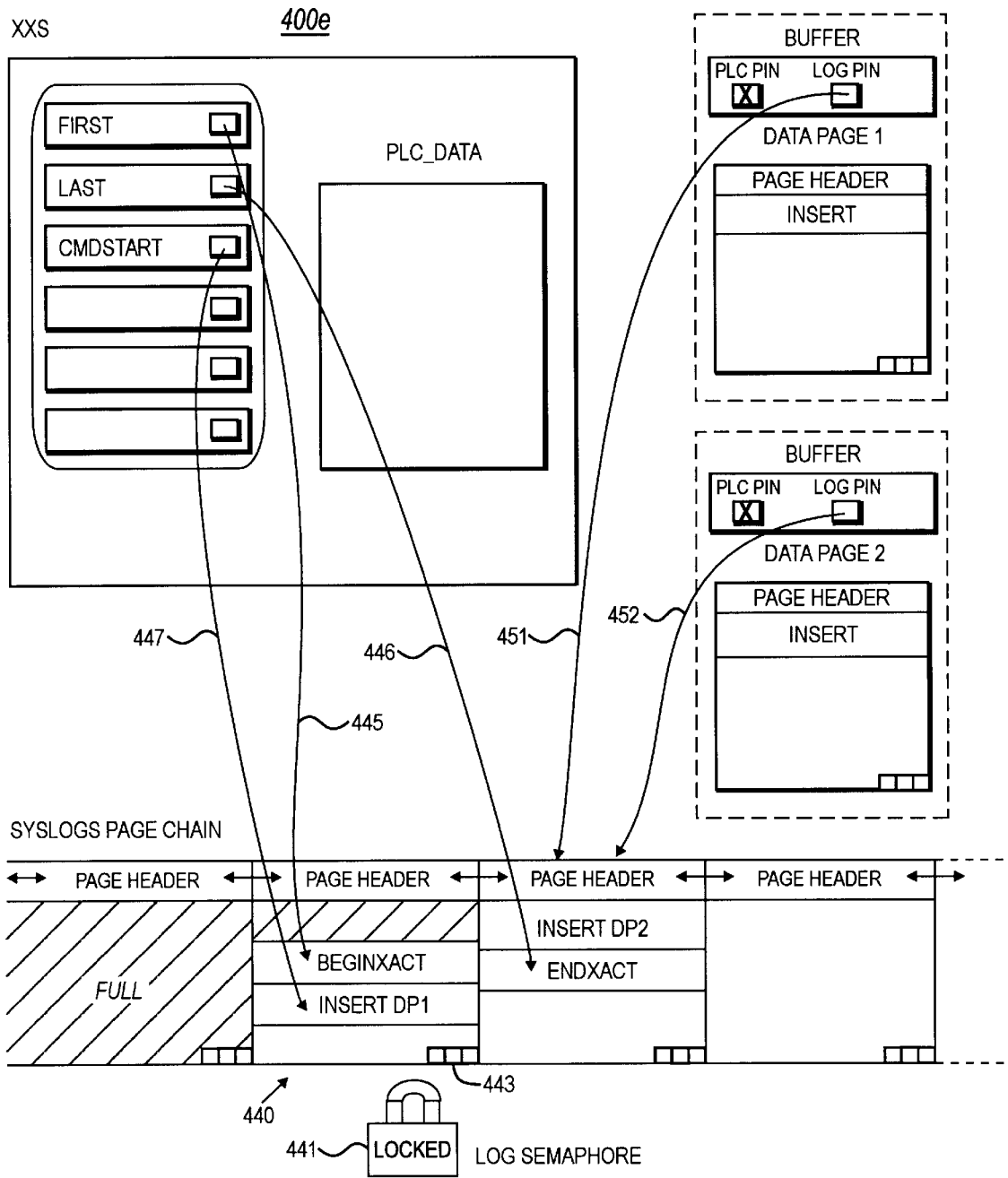

FIG. 4E illustrates the state of the logging data structures (now 400*e*) at the point when the log records have been flushed to the log page chain. FIG. 4E therefore represents a continuation of the events which occur at commit time. As indicated at 440, the log records have been copied from the PLC to the page chain. During this copy operation, the log semaphore is held, as indicated at 441. As each log record is copied, if there is a marker that points to that record then the marker is updated to now store a RID (record ID) value, for indicating the new location of the log record in the log page chain. Recall that each RID value comprises a page ID and row number. Each row number itself points to an entry in a row number table or directory (e.g., row number table 443). Each row number table entry, in turn, points to a particular offset within the page where the row begins.

As the BEGINXACT log record is copied to the log page chain, the "first" marker is updated, with a RID value, for pointing to the corresponding location of the log record in the page chain, as indicated at 445. In a similar fashion, the "last" marker is updated to point to the ENDXACT log record in the page chain, indicated at 446. The "command start" marker, similarly, now points to the "insert" log record in the page chain, as indicated at 447. The three markers have all been updated to point to their respective log records, now stored in the log page chain.

In addition to the changes to the log records and the markers, the buffers are updated as follows. Each buffer is "unpinned" from the PLC structure and then "pinned" to the log page chain. The buffers for data pages 1 and 2 are "unpinned" from the PLC structure and then "pinned" to the last log page storing the flushed log records, as indicated at 452. Therefore, in a manner similar to that done for the markers, the buffers are now pinned to the log page chain.

2. EXAMPLE #2

Figure 5A:
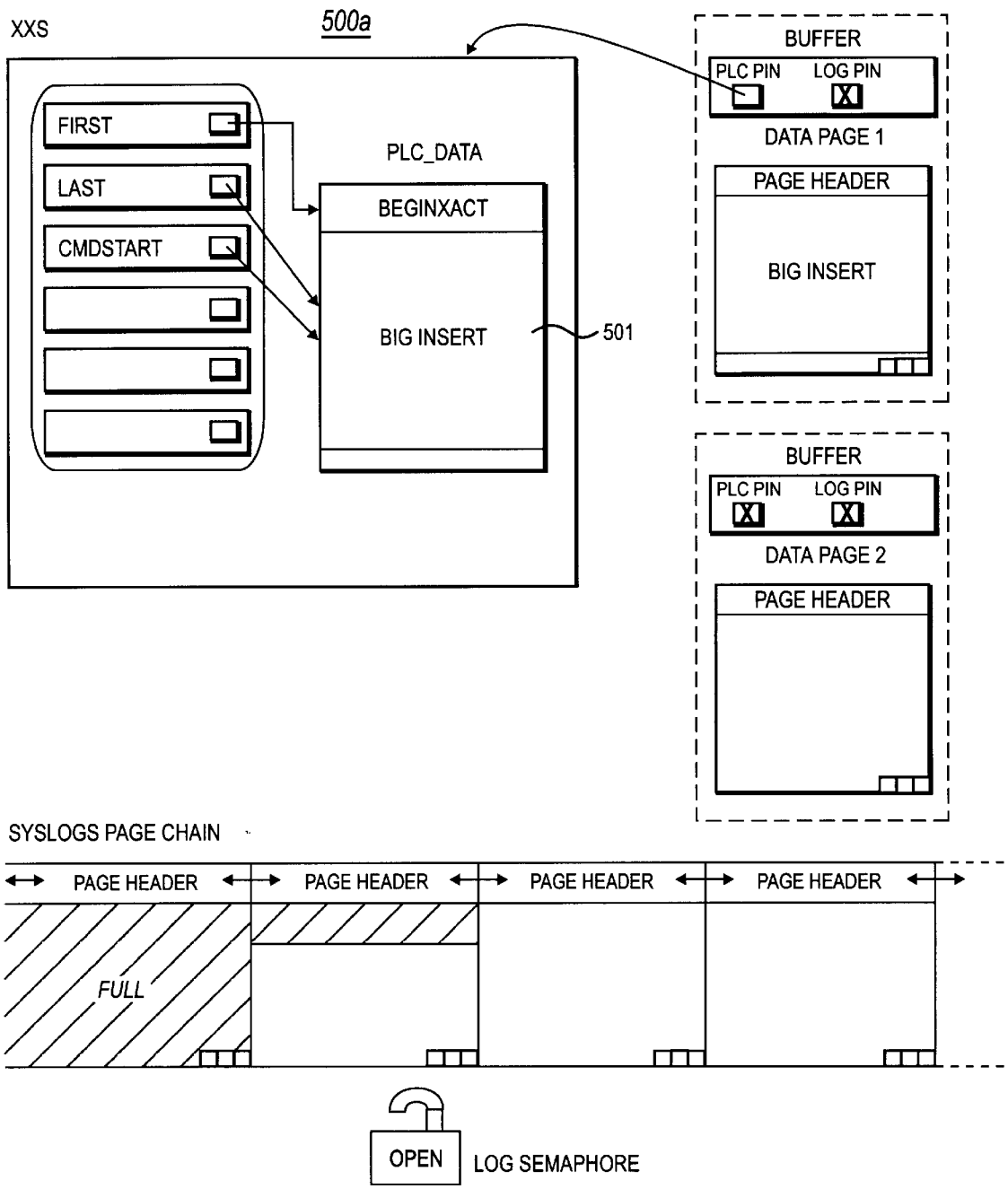
FIGS. 5A–E are block diagrams of the logging data structures illustrating system processing when a private log cache (PLC) reaches a state where it is full.

The next example illustrates processing when the private log cache reaches a state where it is full. FIG. 5A illustrates the state of logging data structures (500*a*) at the point which a transaction has begun and a command to insert a large row (i.e., "big" INSERT) has been processed. As illustrated at 501, the insert is sufficiently large that it has almost filled up the private log cache. For this example, another insert will occur which cannot be immediately accommodated by the private log cache.

Figure 5B:
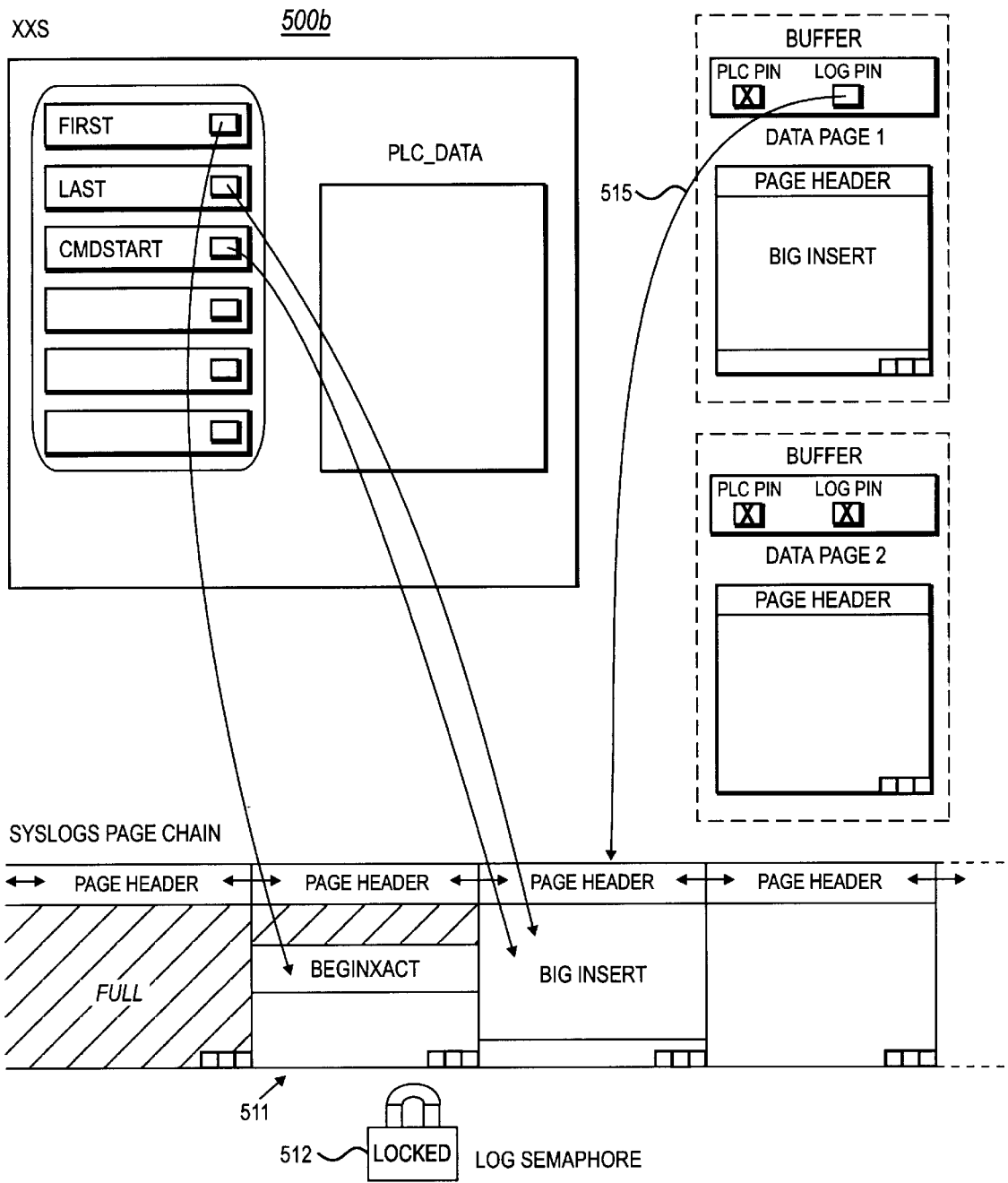

FIG. 5B illustrates the logging data structures (500b) when the additional insert has arrived. Now, since the private log cache cannot accommodate the new insert, the previous "big" INSERT (log records) need to be flushed from the private log cache to the log page chain. As illustrated in FIG. 5B, the log records are copied to the log page chain, indicated at 511. This is done under the control of the log semaphore, as shown at 512. In a manner similar to that described above, the XLRMARKERs are updated to now point to their respective log records as they reside in the log page chain. Also, the buffer (buffer for data page 1) is "unpinned" from the private log cache and "pinned" to the corresponding log page chain, as indicated at 515.

Figure 5C:
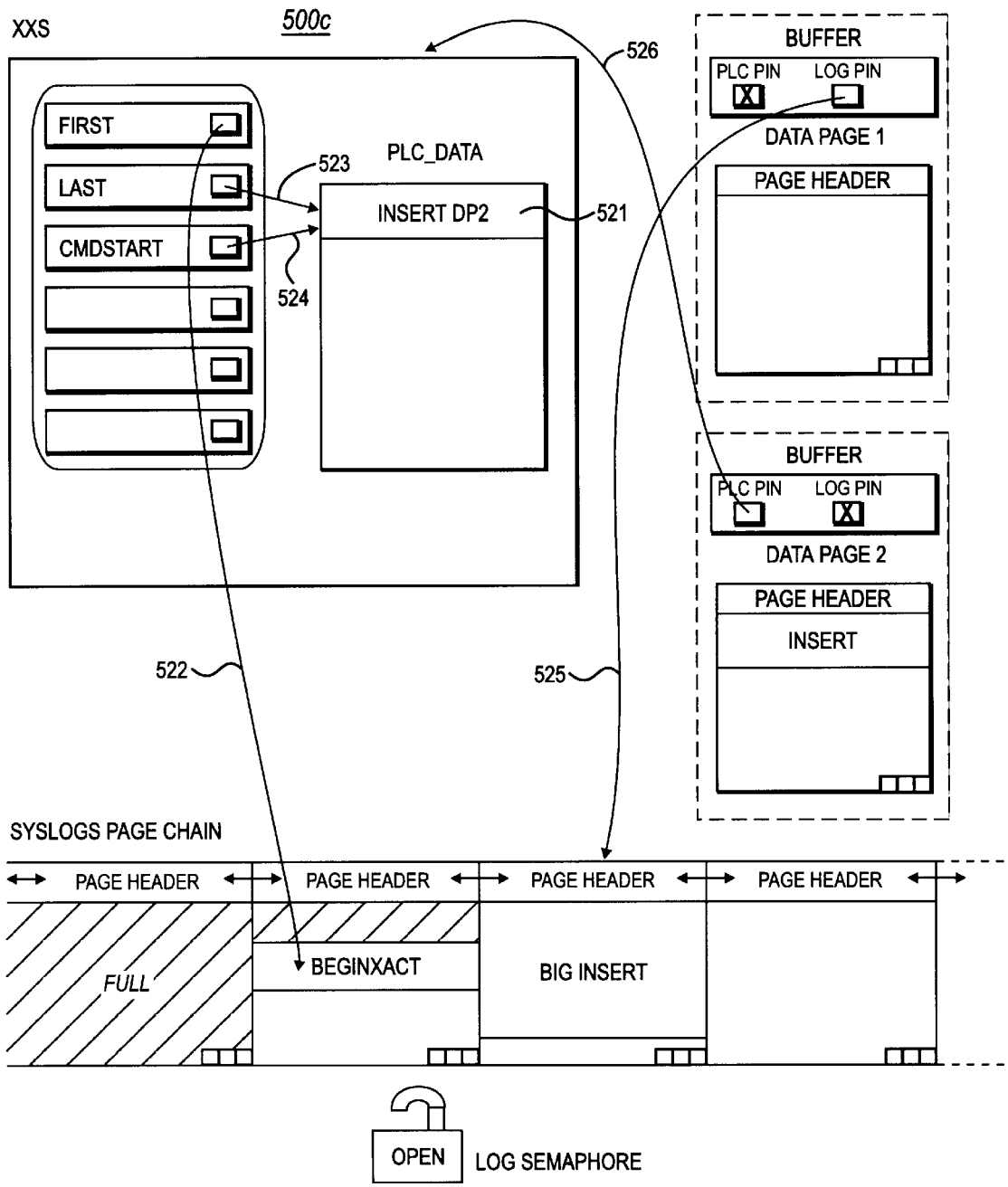

FIG. 5C illustrates the state of the logging data structures (500c) at the point of processing the new insert. Now, the "insert" log record for the data insert on data page 2 is appended to the private log cache, as indicated at 521. The "first" marker points to the log record in the log page chain, as indicated by 522. The "last" marker points to the new "insert" log record, as indicated at 523. Additionally, the "command start" marker points to the new "insert" log record, illustrated at 524, since the insert is associated with a different statement (i.e., different SQL INSERT statement). At this point, data page 1 is pinned to the log, as indicated at 525. Data page 2, on the other hand, is pinned to the private log cache, as indicated at 526.

Figure 5D:
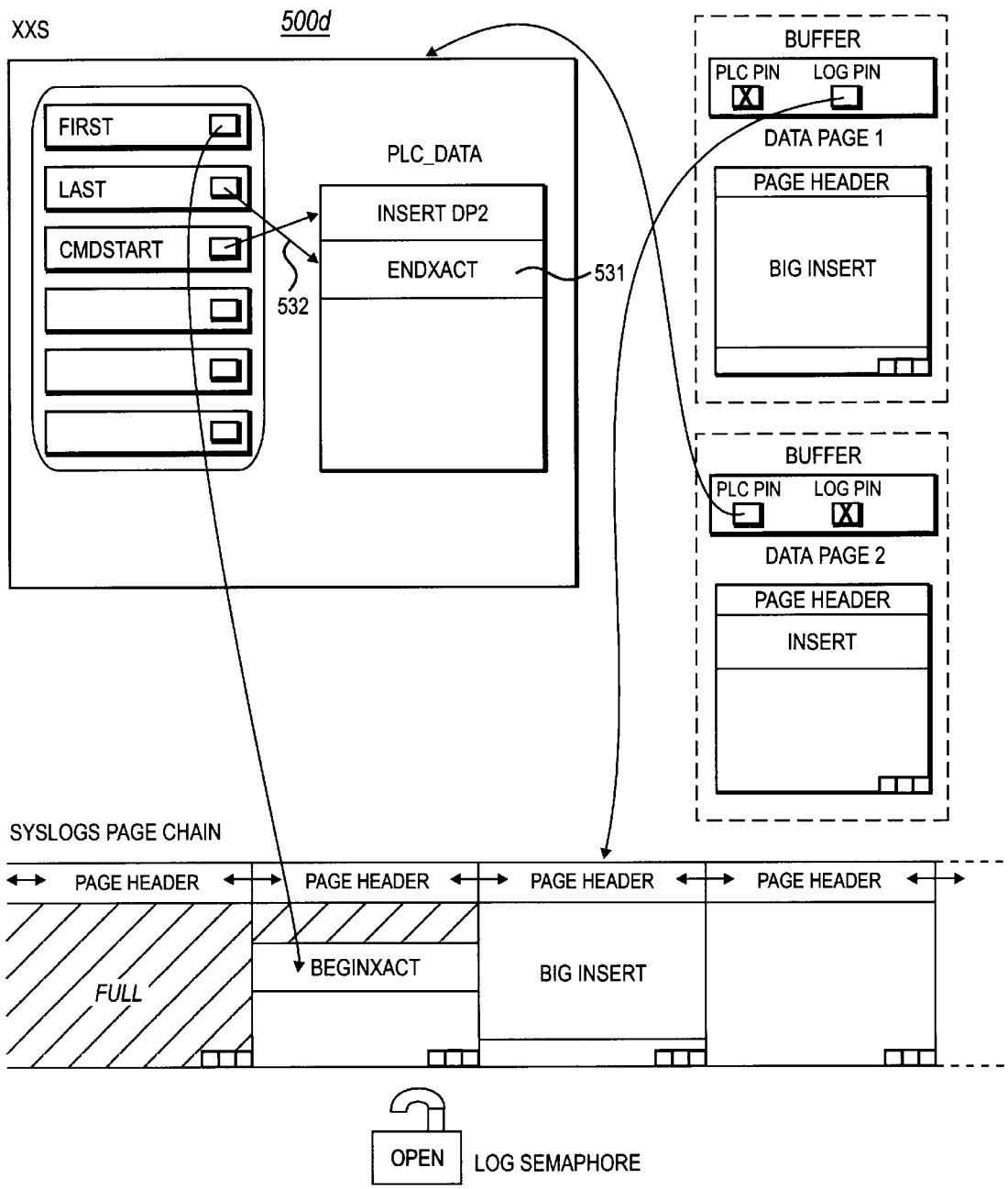
Figure 5E:
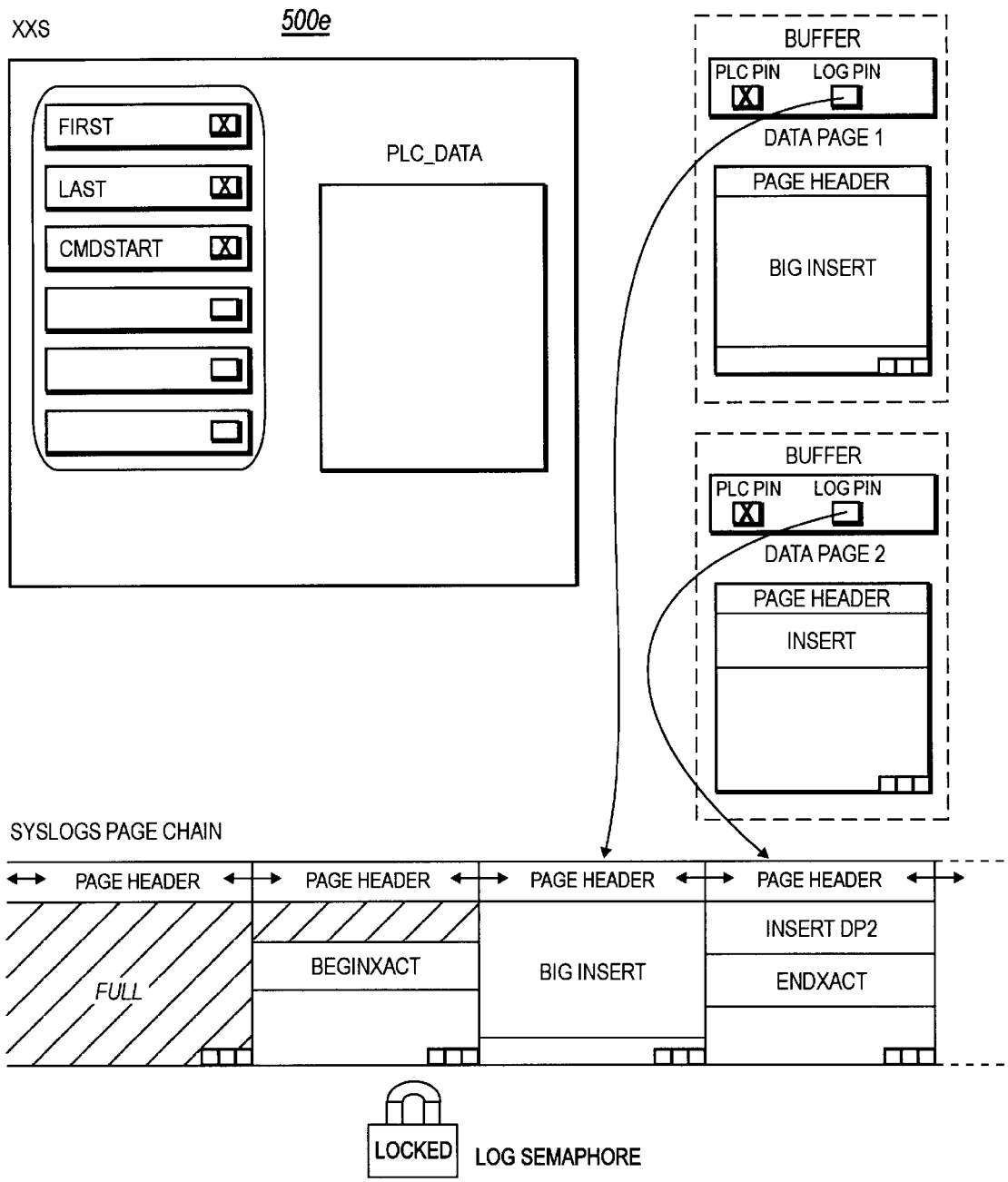

Continuing with the example, FIG. 5D illustrates the state of the logging data structures (500d) at the point when the transaction attempts to commit (i.e., COMMIT SQL command statement). The corresponding ENDXACT log record is appended to the private log cache, as indicated at 531. As this represents the last log record, the "last" marker is set to point to it, as indicated at 532. FIG. 5E illustrates the state of the logging data structures (500e) at the point where all logging records are flushed to the page chain. As illustrated in the figure, both data page buffers are now pinned to the log page chain.

3. EXAMPLE #3

FIGS. 6A–E illustrate processing of the logging data structures for the scenario where a data page used by a pending transaction is written from memory, for instance, when the page is written from memory by a virtual memory manager, because the transaction is inactive. Because the data page is being written to disk, it is necessary for the buffer for that page to undergo the unpinned process. The private log cache itself operates under control of a lock so that another transaction, if appropriate, can lock the structure and flush the cache (e.g., for memory management purposes).

Figure 6A:
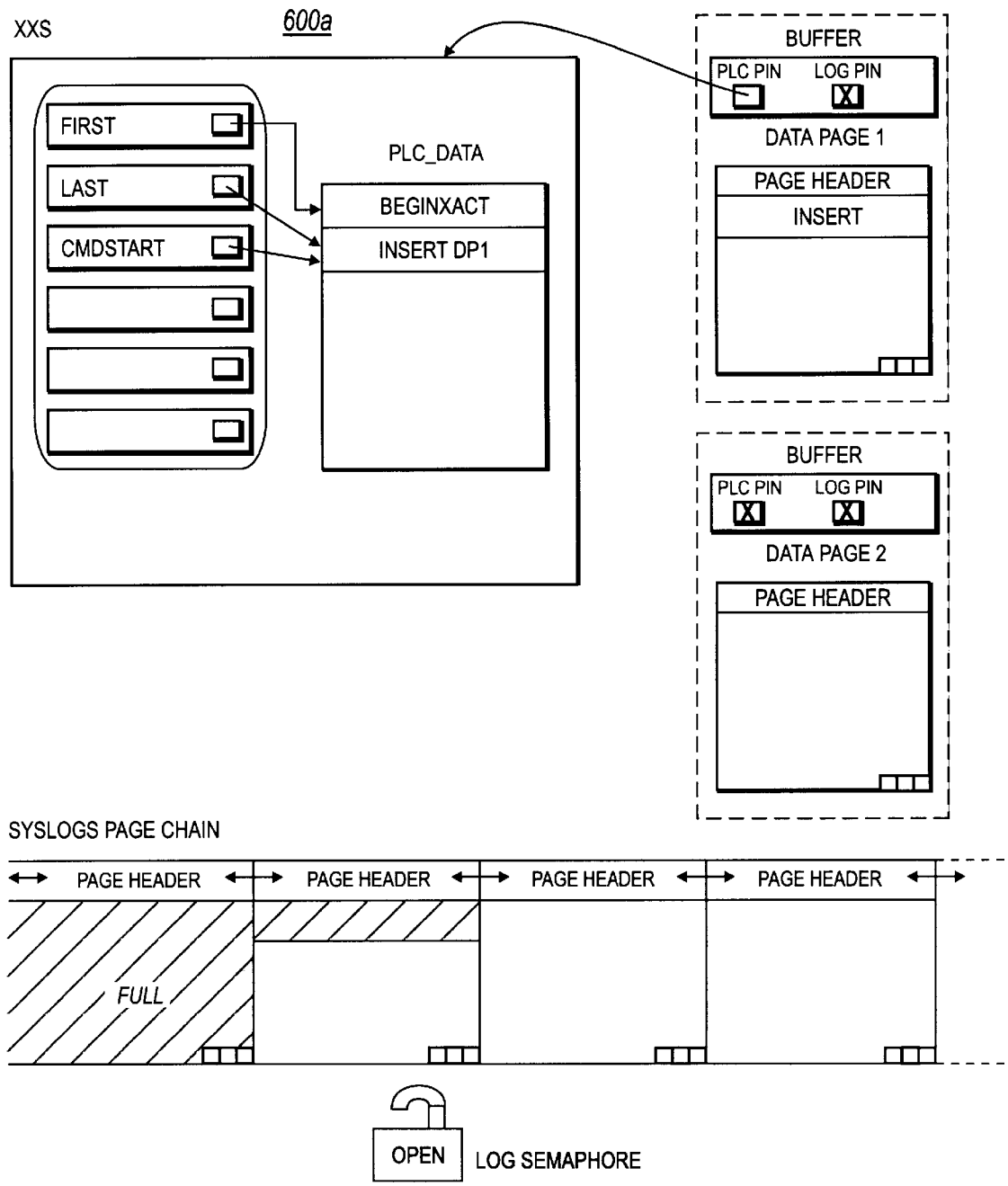
FIGS. 6A–E are block diagrams of the logging data structures of the present invention illustrating processing in the system for an example where a data page used by a pending transaction is written to disk (e.g., by a virtual memory manager).
Figure 6B:
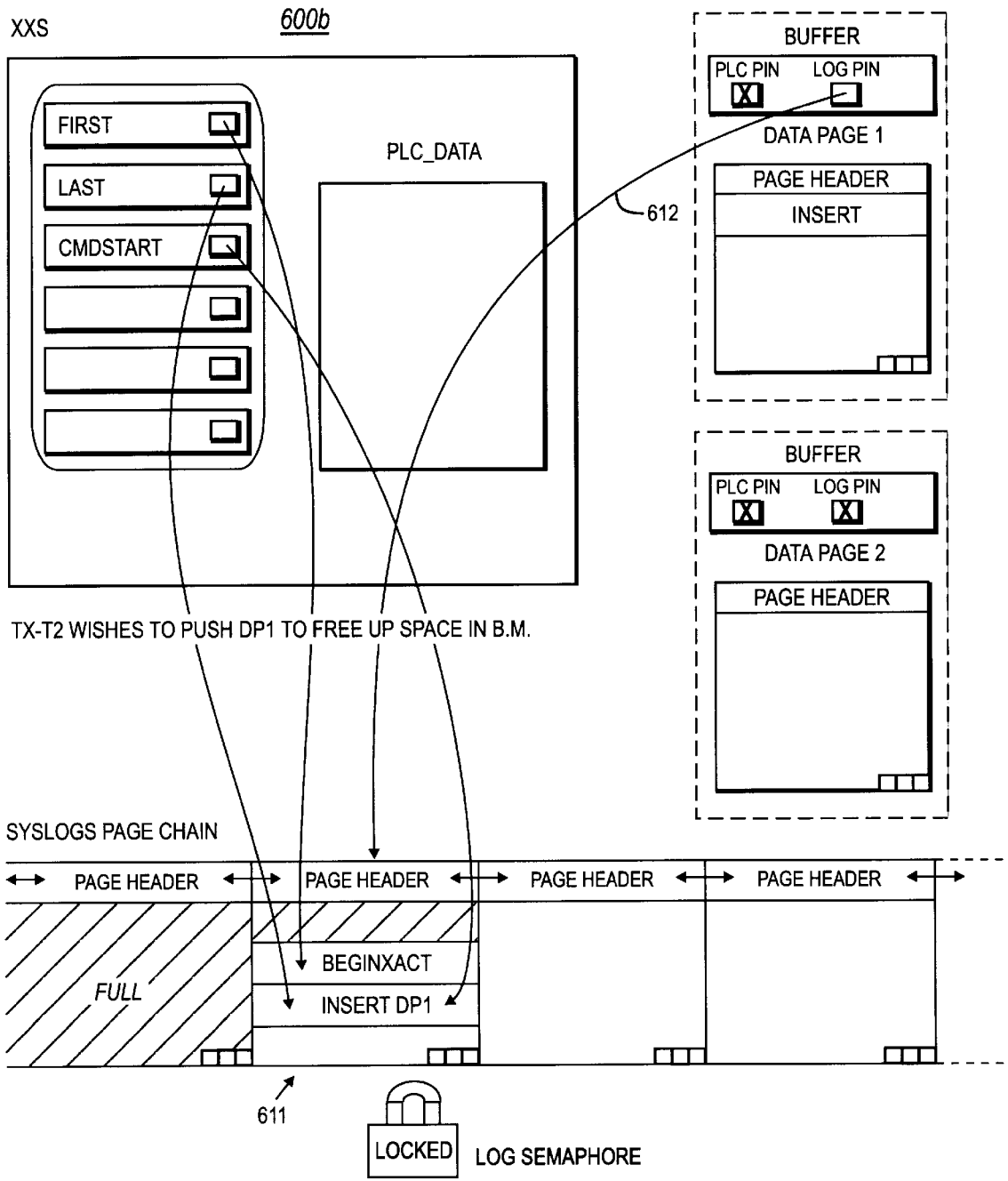

As shown for logging data structures 600a in FIG. 6A, the buffer for data page 1 is pinned to the private log cache, since log records reside there. Suppose now that the transaction using the page, transaction T1, is inactive for some period of time, thus, causing the system to swap out the page. The act of unpinning of the page's buffer causes the private log cache to flush the log records to the log page chain. This is illustrated for the logging data structures (now 600b) in FIG. 6B. As shown at 611, the log records have been copied to the log page chain; the private log cache is now empty. Accordingly, the markers are updated (with RID values) for referencing their respective log records as they reside in the log page chain. Finally, FIG. 6B indicates that the buffer for data page 1 is now pinned to a log page, as indicated at 612.

Figure 6C:
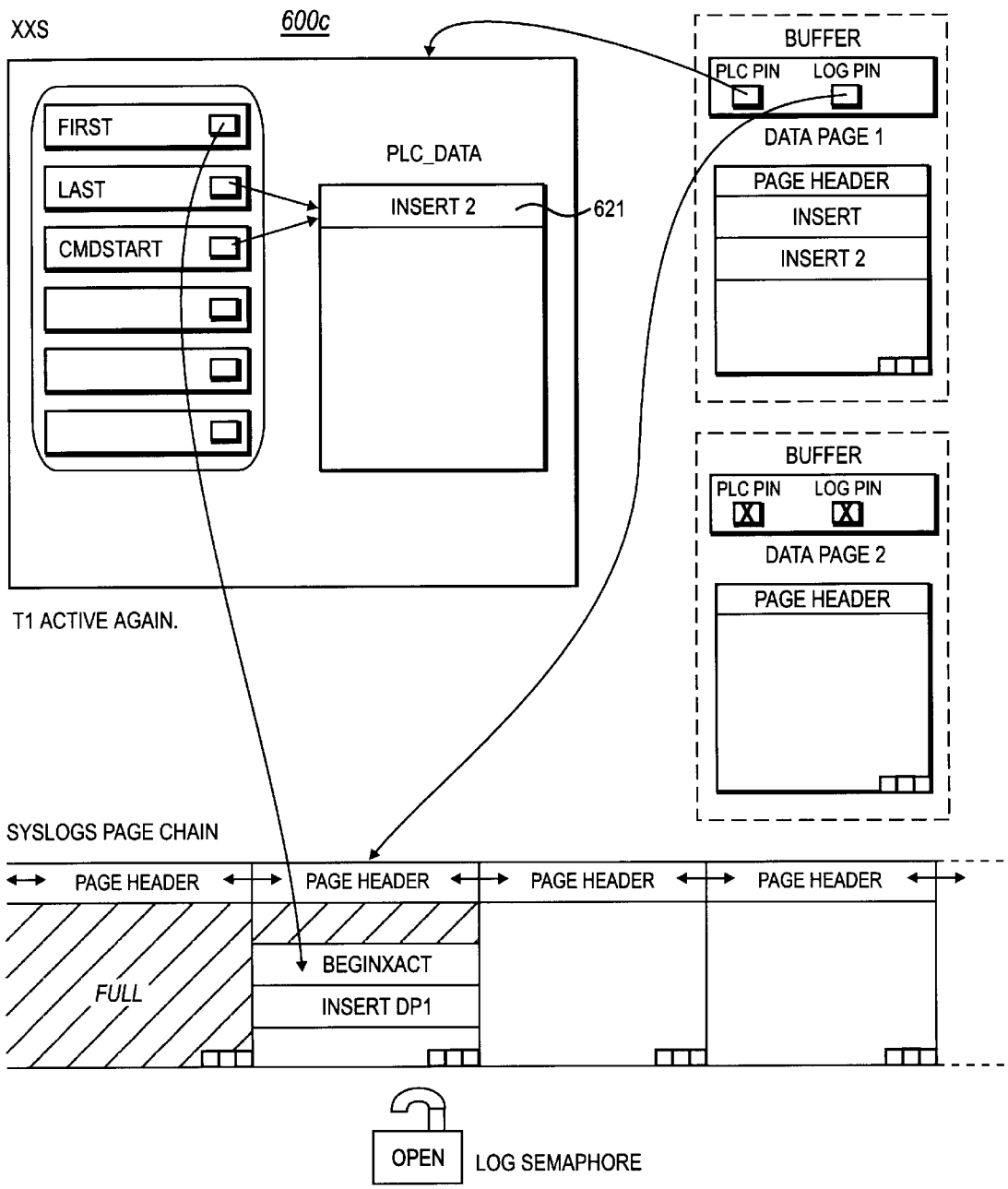

FIG. 6C illustrates logging data structures (600c) when the transaction T1 again resumes activity. Note here that the log records are not brought back into the private log cache. Instead, they are simply left in the log page chain. As the transaction continues, however, new log records are posted to the private log cache, such as the log record at 621 indicating a new insert on the data page.

Figure 6D:
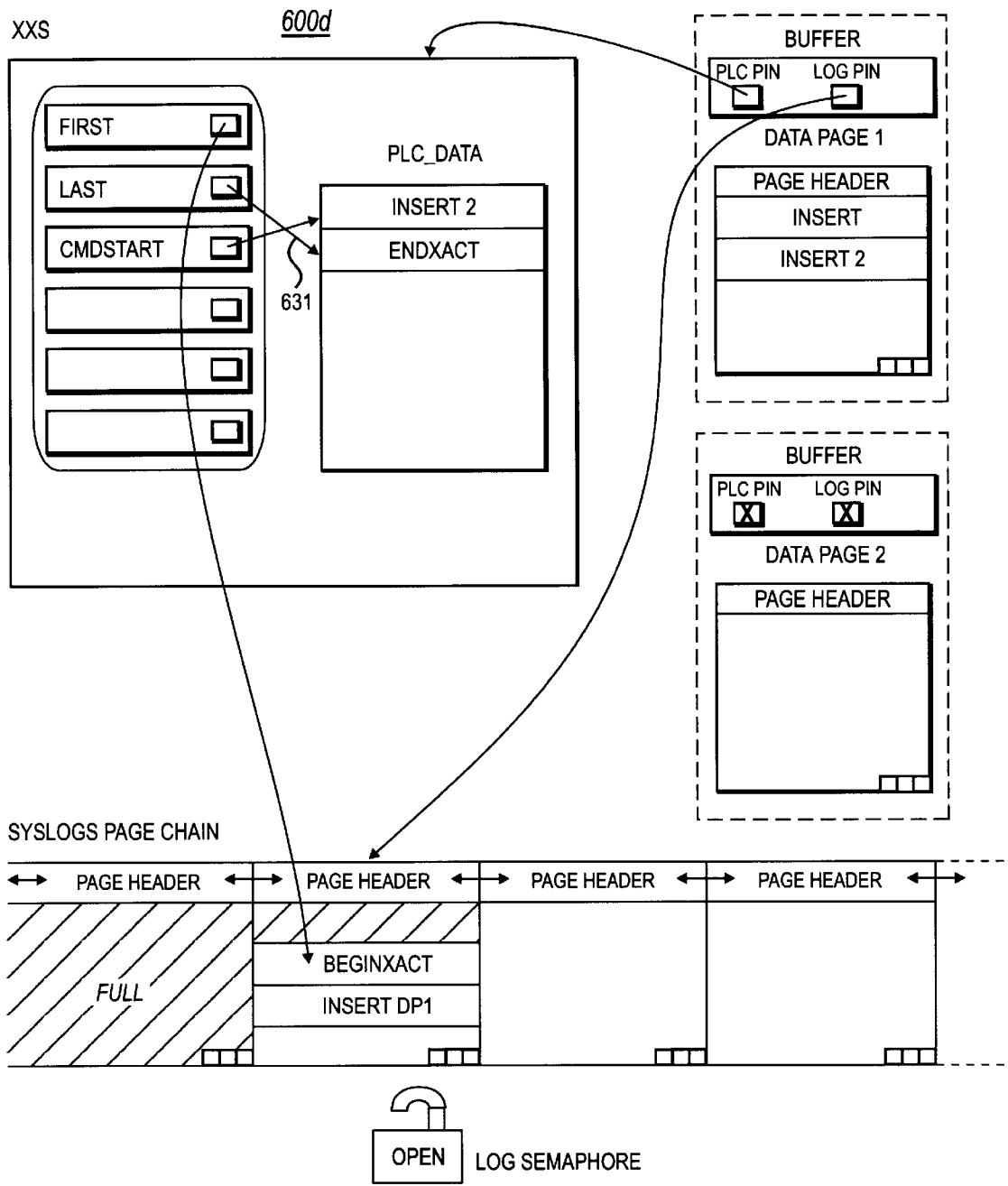
Figure 6E:
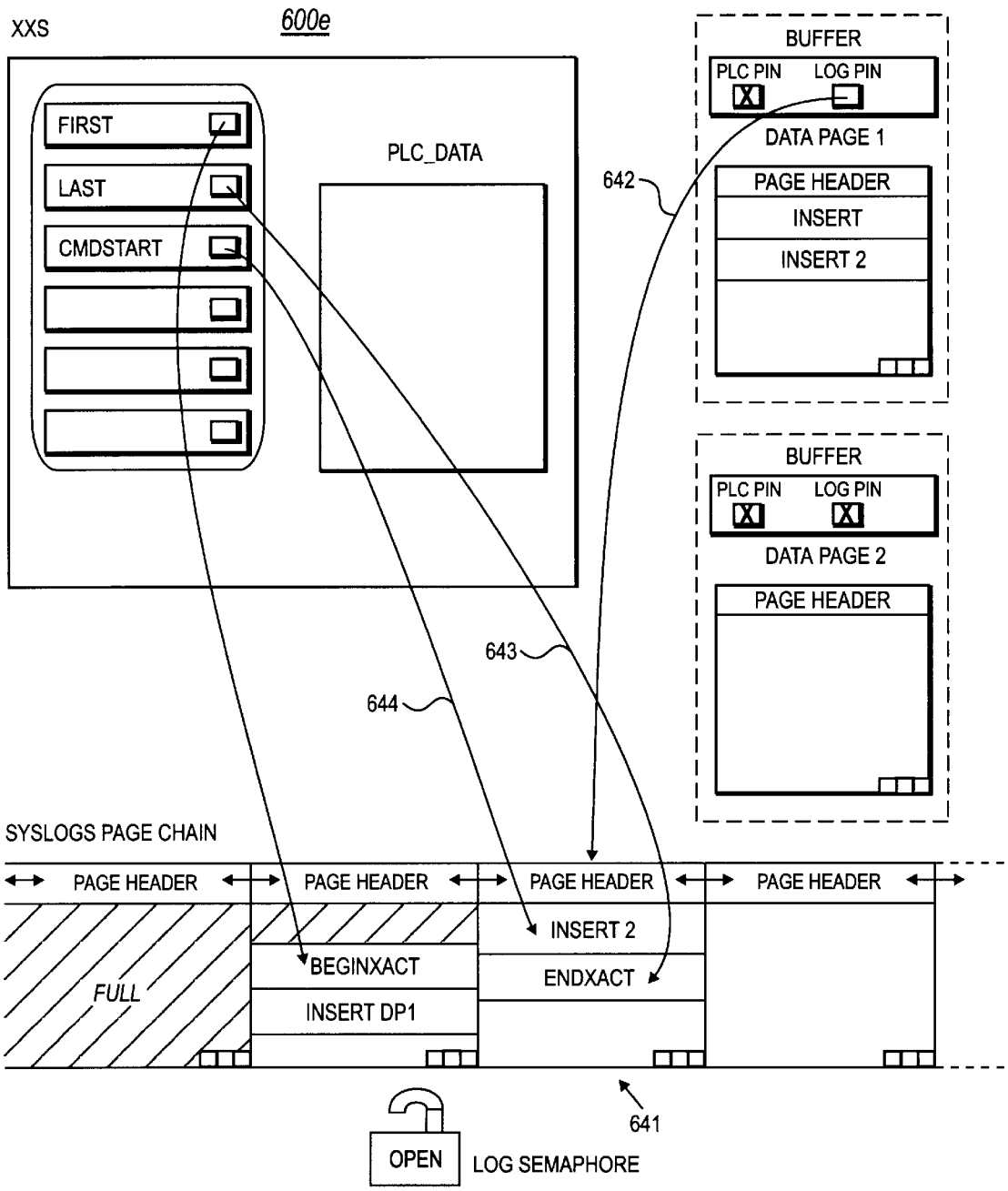

FIG. 6D illustrates the state of logging data structures (600d) at the point when the transaction is to commit. Now, the "last" marker is updated to point to the ENDXACT log record, as indicated at 631. The system is now ready to flush the log records. This is illustrated in FIG. 6E, for logging data structures 600e. Specifically, all remaining log records have been flushed to the log page chain, as indicated at 641. The buffer for data page 1 has been unpinned from the private log cache and pinned to the log page chain, as indicated at 642. Finally, the XLRMARKERs which pointed to log records in the private log cache are updated (with RID values), as indicated at 643 and 644, for pointing to the log records as they reside in the log page chain.

4. EXAMPLE #4

Figure 7A:
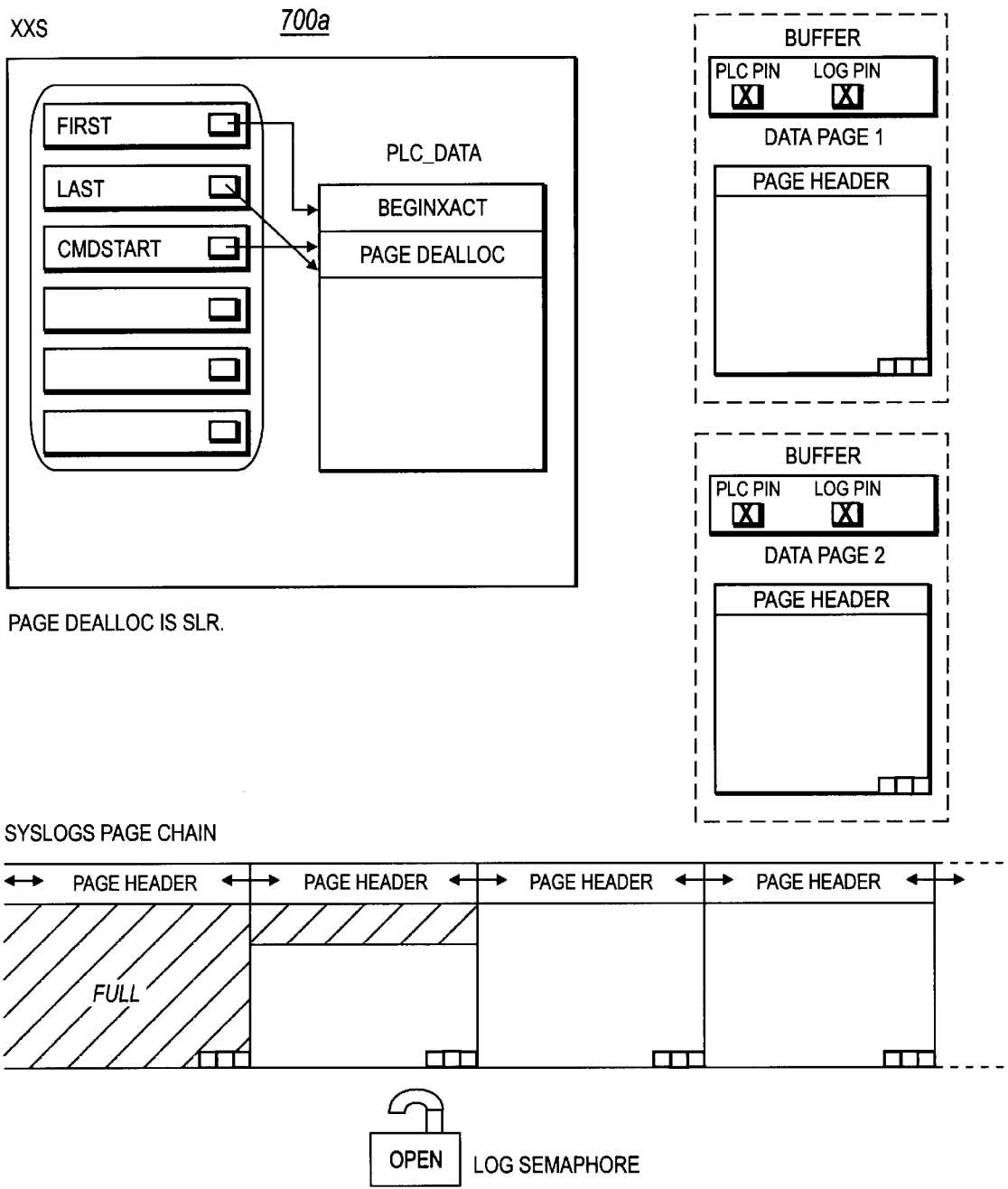
FIGS. 7A–C are block diagrams of the logging data structures of the present invention illustrating system processing in the instance where a client request immediate flushing of log records.
Figure 7B:
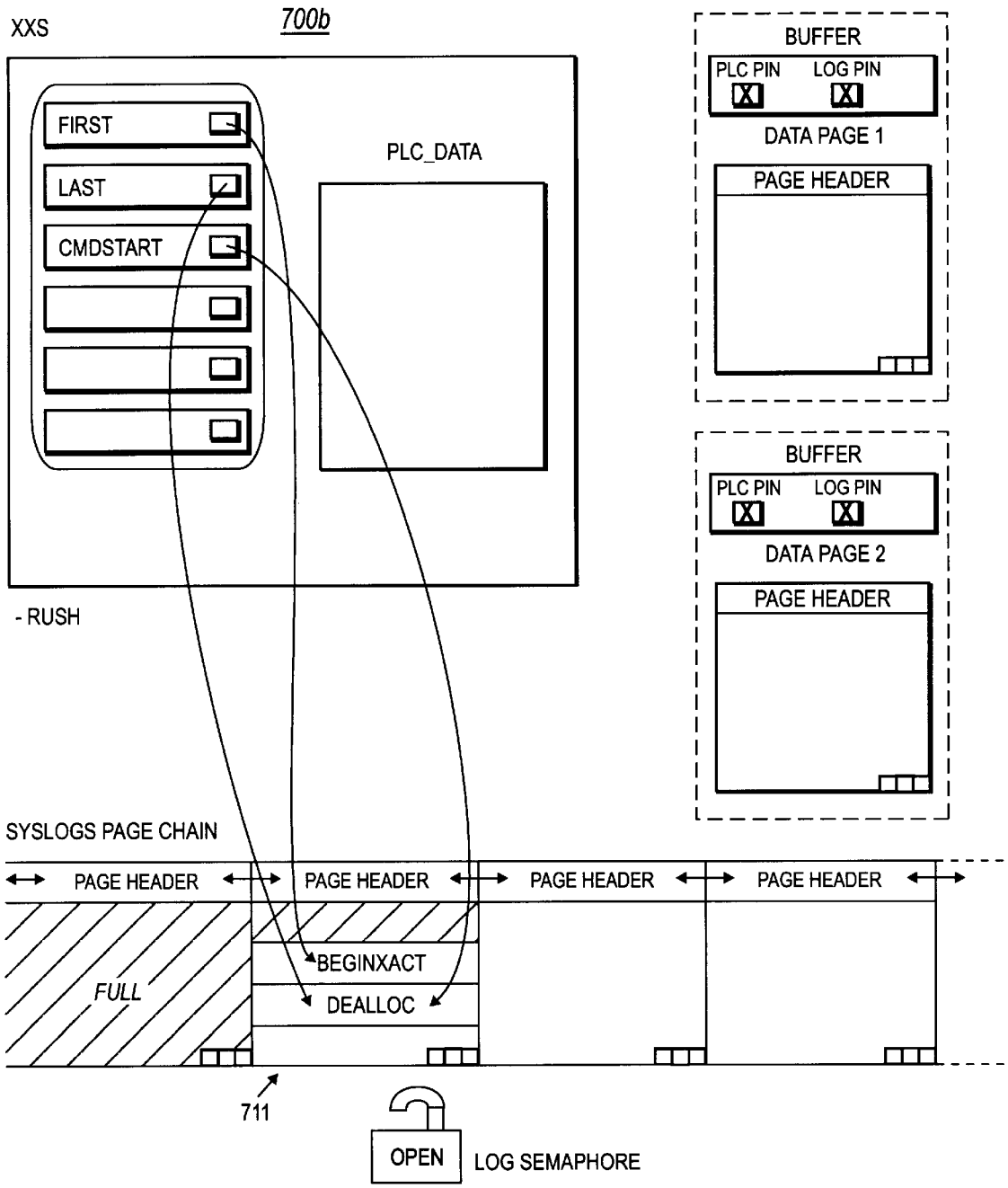
Figure 7C:
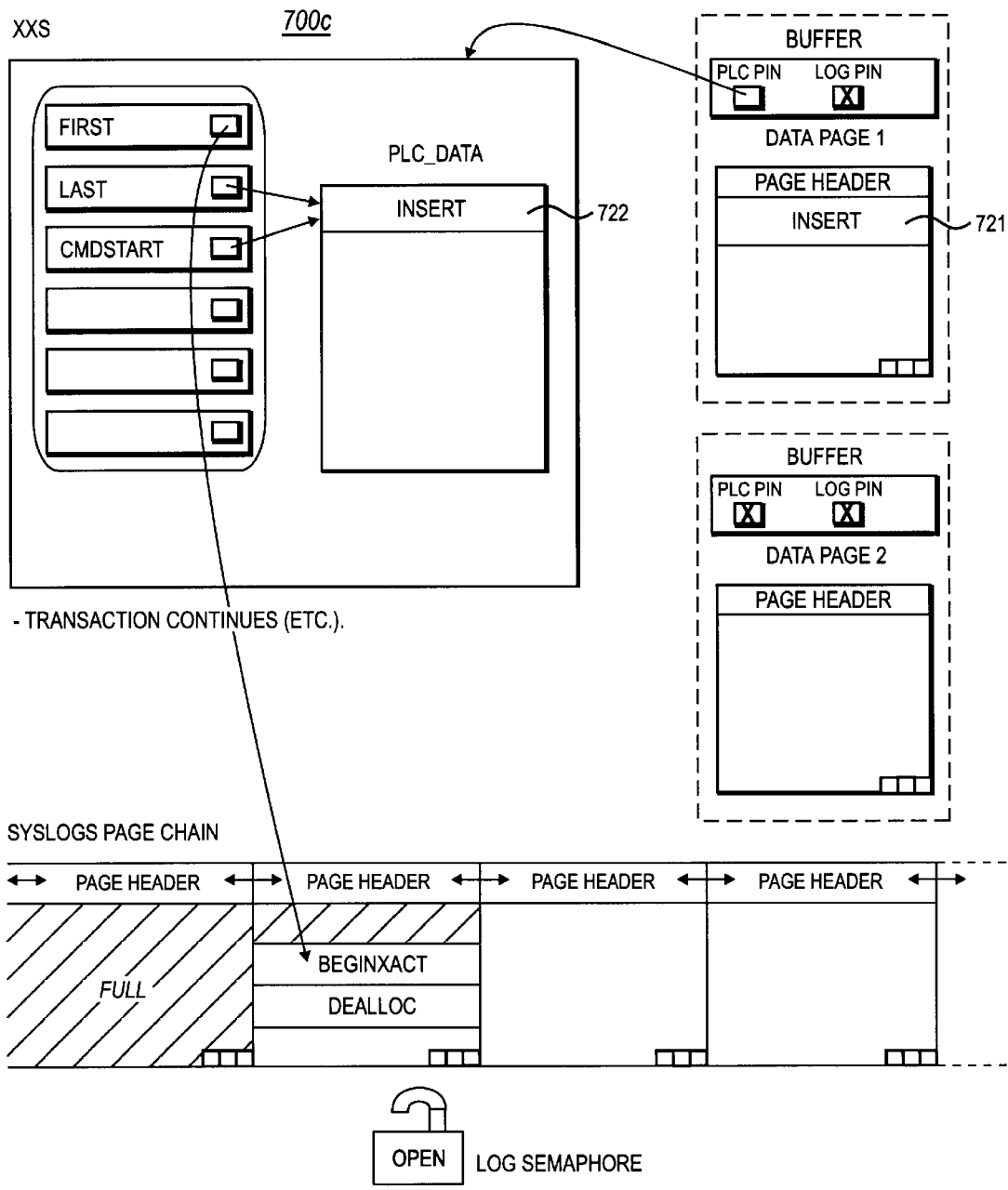

FIGS. 7A–C illustrate a final scenario where a client requests immediate flushing of log records. This request is referred to herein as a "single log record" (SLR) transaction. A common example of such a transaction occurs during a request for page deallocation (e.g., occurring in response from a DELETE FROM SQL statement).

FIG. 7A illustrates the state of logging data structures (700a) at the point where page deallocation is requested. As shown, the private log cache stores a "begin transaction" log record and a "page deallocation" log record. The XLRMARKERs point to appropriate log records, in the manner previously described. Next, flushing of the log records to the log page chain occurs. This is illustrated in FIG. 7B, for logging data structures 700b. The log records have been flushed to the log page chain, as indicated as 711. The XLRMARKERs have been updated to now point to the log records as they reside in the log page chain.

Even though an event has occurred which requires immediate flushing of log records, the private log cache accommodates the scenario and then continues on supporting the transaction. As illustrated in FIG. 7C for logging data structures 700c, data has been inserted into data page 1, shown at 721, thus leading to an insert log record being appended to the private log cache, as indicated at 722. The "last" marker and the "command start" marker point to this new log record. The "first" marker, on the other hand, continues to point to the BEGINXACT log record, as it resides in the log page chain. This example serves to illustrate, therefore, that the transaction continues to use the private log cache despite the fact that certain log records associated with the transaction have already been flushed.

Backup system

A. Glossary

For the purposes of this discussion the following terms will be defined:

An ALLOCATION PAGE is a descriptor within the database or file system which describes a block of PAGES in a database. In one embodiment an ALLOCATION PAGE will contain 32 EXTENT DESCRIPTORS.

An ALLOCATION UNIT is a block of 256 database pages described by an ALLOCATION PAGE. In one embodiment, an ALLOCATION UNIT will contain 32 EXTENTS.

An ARCHIVE DEVICE is an I/O device used for making bulk copies of on-line data.

An ASSIGNMENT OF A PAGE is the creation of a mapping of a logical page to a stripe. This mapping occupies an element in a STRIPE DIRECTORY.

A BACKLOGGED DEVICE is a device which has a high number of pending requests for work compared to other devices available for service.

A CURRENT ELEMENT NUMBER is a temporary variable used in determining whether the STRIPE NUMBER for a given logical page has been located. Given the stripe number the invention can refer to the corresponding archive device to which it will write the page.

A DATABASE DISK PIECE is a distinct contiguous interval of database disk blocks. In Sybase® databases, the sysusage table identifies these intervals of disk blocks.

A DIRECTORY ELEMENT is a slot in the STRIPE DIRECTORY that expresses the number of EXTENTS assigned to a single STRIPE for a specific ALLOCATION PAGE.

A DUMP START RID identifies the most recent transaction log record as of the start of the backup session. The invention uses it to establish the start of the region of the transaction log that will contain records for transactions which commit while the backup session proceeds.

An EXTENT is a contiguous interval of disk pages the identifier of whose first page is an integer multiple of the size of the interval. In one embodiment an EXTENT contains 8 PAGES.

An EXTENT COUNT is the number of EXTENTS assigned to a STRIPE.

An EXTENT DESCRIPTOR is an entry contained in an ALLOCATION PAGE which describes an EXTENT within the corresponding ALLOCATION UNIT.

An EXTENT GROUP is an interval of EXTENTS assigned to a STRIPE.

A FREE EXTENT is an EXTENT which is not accounted for as belonging to any object within the database or file system. A FREE EXTENT is available for allocation to an object and filling with new data.

A LOGICAL PAGE is a page which belongs to a Sybase database. Each logical page has a unique integer identifier called a logical page number.

The MAXIMUM STRIPE DENSITY is the smallest number of stripes which must be used when determining the STRIPE AFFINITY for a set of EXTENTS.

A PAGE is a fixed-size, addressable container of data in a computing system. Pages generally begin at locations, or addresses, that are integral multiples of the page size. Generally, to access a page, one gives its number or address to the computing system.

A PAGE TIMESTAMP is a field within a logical page which indicates the time of the last modification to that page.

A PARTIAL EXTENT is a RESERVED EXTENT which contains at least one PAGE available for allocation.

A PHASE is a time interval within a backup session during which only database pages having specific properties may be dumped. Under Sybase® Backup Server software Release 10.0, three phases are defined. These phases elapse within a single session and execute as:

1) dump all allocated database and log pages;
2) dump all pages which changed during Phase 1 in a way that cannot be completely reconstructed from transaction log information; and
3) dump all log pages that have existed continuously between the beginning of Phase 1 and the end of Phase 2.

Phases start when the SQL Server sends an RPC to the Backup Server initiating a phase. Phases end when all of the I/O initiated during the phase has physically been completed.

The PHASE BOUNDARY is the point in time that marks the beginning or end of a PHASE.

PHASE OPTIONS are a list of qualifiers provided to the RPC to indicate that a new phase should begin. PHASE OPTIONS are used by the SQL Server to tell the Backup Server how to perform dump I/O for the phase. One PHASE OPTION is BS_YOUSCAN which tells the Backup Server to read the ALLOCATION PAGES directly from the database, perform STRIPE AFFINITY calculations, generate lists of DATABASE PAGES to dump to their corresponding STRIPES, and finally perform the STRIPE I/O specified in the lists. When all STRIPE I/O from the lists is physically complete, the Backup Server signals completion of the begin-phase RPC to the SQL Server. The SQL Server then sends another RPC to mark the end of that phase. In a non-optimized situation, if the SQL Server does not specify BS_YOUSCAN, the Backup Server generates a default set of STRIPE DIRECTORIES, the contents of which do not depend on ALLOCATION PAGE contents. The SQL Server then sends lists of pages for dumping to the Backup Server, instead of the Backup Server generating the lists internally as for it does for BS_YOUSCAN. The SQL Server then sends another RPC to mark the end of that phase.

A REMAINDER STRIPE is the STRIPE to which all EXTENTS unaccounted for in the DIRECTORY ELEMENTS for the ALLOCATION PAGE are to be assigned.

A RESERVED EXTENT is an EXTENT that belongs to some database or file system object.

AN RPC is a Remote Procedure Call which is a service that allows one process to call a software procedure in another process. The processes may be running on separate machines.

The SESSION HANDLER is the process created within the Backup Server in response to a connection from the SQL Server. This process controls the progress of a DUMP or LOAD session.

A STRIPE is an archive device denoted by its position within an ordered set of archive devices in concurrent use. Usage of STRIPES involves writing or reading a collection of PAGES to or from a set of archive devices so that the devices operate concurrently and performance is increased.

STRIPE AFFINITY is a method for ensuring the integrity of database backups made to multiple backup devices simultaneously. Stripe affinity permits reloading backups from fewer devices than used to make the backup.

The STRIPE DENSITY is the number of stripes used to dump a given block of disk pages, such as an ALLOCATION UNIT.

The STRIPE NUMBER is the numeric position of a STRIPE within an ordered set of STRIPES.

The STRIPE DIRECTORY is the data structure that expresses the number of EXTENTS assigned to each of the STRIPES for a specific ALLOCATION PAGE, a collection of DIRECTORY ELEMENTS plus a REMAINDER STRIPE FIELD.

VARIABLE WIDTH DIRECTORY ELEMENTS allow the allocation of smaller stripe directory elements as the number of stripes increases beyond a pre-defined point.

B. SQL Backup Server

Figure 8:
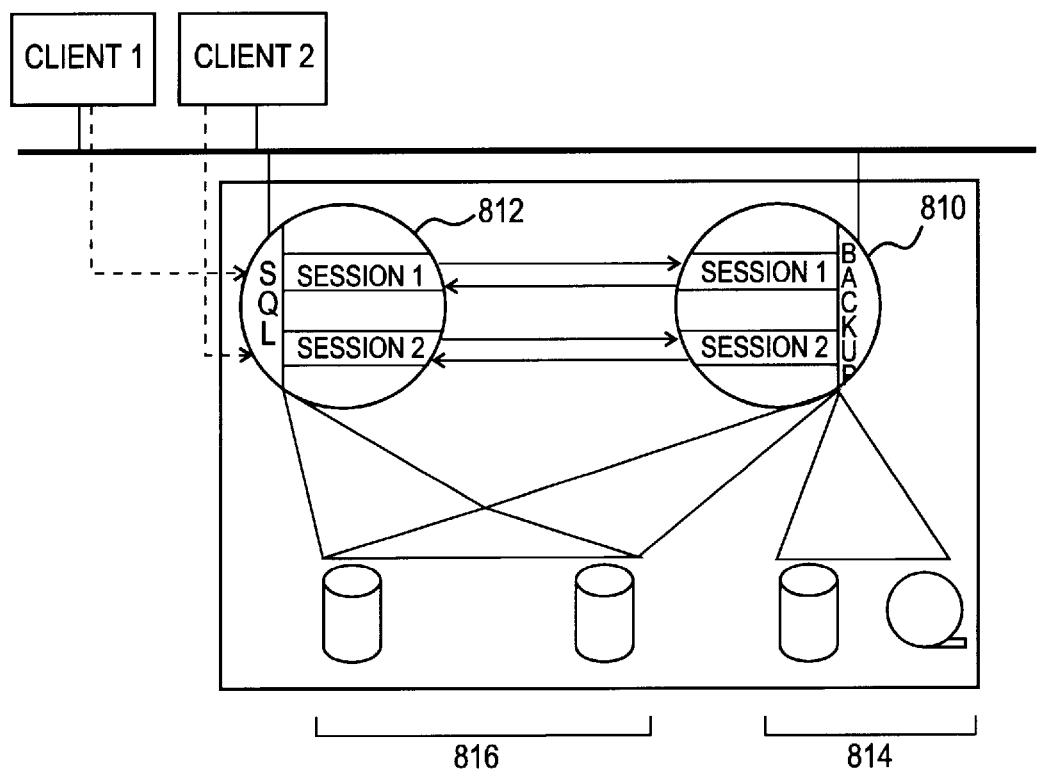
FIG. 8 is an illustration of a typical SQL Server/Backup Server installation made in accordance with the instant invention.

Referring first to FIG. 8, a typical operating environment for a Database Server and Backup Server provided in accordance with the invention is shown. For purposes of this description, it is assumed that the database engine or server is a SQL Server, Release 10.0, such as the type currently available from Sybase, Inc. of Emeryville, Calif. However, the architecture of the improved data backup system may be applied to any suitable transactional database or transactional file system which requires the benefits provided by the instant invention.

In the preferred embodiment, the backup system of the invention coordinates the transfer of information between a Backup Server 810 and an SQL Server 812 to produce a recoverable database dump using a special dump synchronization protocol. The dump synchronization protocol may run on a controller (not shown) and control the operation of both the Backup Server and the SQL Server. The controller may also be integrated into the architecture of the Backup Server 810, the SQL Server 812 or both. Both the Backup Server 810 and the SQL Server 812 have access to database devices 816. In addition, the Backup Server 810 can address multiple archive devices 814.

The dump synchronization protocol ensures recoverability of archived data by organizing the dump operation from the SQL Server 812 to the Backup Server 810 into a set of phases. In addition, through the use of a number of phase options, the Backup Server 810 is capable of determining the best strategy and order for moving database pages stored on database device 816 from the SQL Server 812 to the Backup Server 810 in order to expeditiously and efficiently archive the contents of the database.

Since one of the strategies for increasing the performance of the backup system is to enable unsynchronized database dumps, it is preferable that once a dump is initiated the Backup Server 810 and the SQL Server 812 perform only minimal or no synchronization of access to those database pages on the target database device 816 which are to be backed up. This is advantageous over currently available systems since by providing for such unsynchronized database dumps, the full bandwidth of the available I/O subsystem may be utilized without being locked to SQL Server events.

Referring next to FIG. 9, the basic synchronization scheme used in the database dump of the instant invention is shown. As can be seen, dumps are ordered into phases. In Phase 1, a user initiates a request to dump an image of the database to an archive device. The SQL Server blocks the initiation of any other dumps of the target database 920 and records a dump START RID 922. After recording the dump START RID, the SQL Server signals the Backup Server to begin dumping 924. At this point, the Backup Server begins its dump utilizing begins its dump utilizing the fully available I/O bandwidth 926. A transaction list is also built at this point including a flush list 928. When this initial Phase 1 dump is completed, the Backup Server signals the SQL Server that Phase 1 of the dump is completed 930 thereby creating a baseline dump of all the pages which will need to be recorded in the backup database.

It should be noted that the backup system of the instant invention is especially well suited to operation in a transactional database environment where it is necessary to update database pages which have already been backed up during some part of Phase 1, but which may have then changed while another part of the Phase 1 backup was in effect. This rewriting of information takes place during Phase 2 during which pages which have been allocated within pending or committed transactions following the time that the dump START RID was received are dumped again. As noted, it is necessary to dump these pages again because an allocation to a transaction tracking log or a page split which takes place during Phase 1, but after the corresponding allocation unit has been dumped, would not otherwise be recoverable. Under the architecture of the instant invention, it is sufficient to re-dump only those pages which have changed, because those pages will contain information created later in time and will therefore overwrite any earlier recorded data with more current data during a restoration session. A useful way to perform this task without limiting the throughput of the SQL Server during Phase 2 is to keep track of all physical changes made to the database which cannot be completely recovered from log information. These are changes which have not yet been committed. These physical changes include, but are not limited to, page splits from B-tree index updates and new pages generated by index creation. During Phase 1, the SQL Server will maintain a list of pages allocated for these purposes, and this list is known as a flush list 928.

As can be seen in FIG. 9, at the beginning of Phase 2, the SQL Server blocks any tasks attempting to add to the flush list before they issue the corresponding log records 932. The preferred order is to (1) log the change; (2) flush the page; and (3) add the page number to the flush list. This is necessary since without such blocking those log records could not be redone. The SQL Server then determines an end point for the flush list and sends it to the Backup Server 934 while awaiting acknowledgment from the Backup Server that pages in the flush list have been dumped. The Backup Server then dumps those pages 936 and returns a completion message to the SQL Server 938 indicating that Phase 2 has been completed.

Turning next to Phase 3, as can be seen in FIG. 9, the SQL Server handles all the log pages which have been allocated since the start of Phase 1. The records all fall between the dump START RID and the current last record of the log. All other allocations and data are recoverable from this log. The SQL Server captures the current last record of the log 940 (called the dump instant) and constructs a list of all log pages between the dump START RID and the dump instant. It ensures that all those pages have been written to the database and then sends a list of log pages to the Backup Server for dumping 946. Finally, the flush list is discarded and deactivated which has the effect of reactivating tasks waiting on the flush list. When the Backup Server signals the end of Phase 3, the SQL Server permits new dumps once again 950.

It is noted that the incorporation of three (3) phases is not critical to the invention, as Phase 2 is necessitated due to the way that the Sybase® SQL Server program (in its current release) performs transactional logging. Rather, at a minimum only Phase 1 (the data phase) and Phase 3 (the log phase) are required. For example, in a transactional data repository system, such as a database or transactional file system, it is only necessary to perform an unsynchronized copy of the repository in Phase 1, followed by a synchronized copy of the transaction log in Phase 3 (which would be the second actual phase in this example). As noted, the function of a later phase is to capture recovery information for all the changes which have occurred during or subsequent to an initial phase but prior to a secondary phase. In the implementation under the Sybase SQL Server Release 10.0, it is necessary to have a Phase 2 for flushed pages due to the particular Sybase design. However this flushed page concept may not exist in other embodiments and, consequently, a data phase and a log phase alone will suffice.

Utilizing the above process, the use of phases provides for recoverable dumps because the phases are designed to guarantee that at a future load time, every page is restored with the most recent image taken before the dump instant. For this guarantee to hold, the Backup Server must enforce the condition such that for any Phase P, where P is greater than 1, and any page p, all images of page p from Phases 1 through P-1 must be loaded before any image from Phase P is loaded. In other words, the system must enforce a condition that data is saved and then reloaded in time sequence order such that later transactions will overwrite earlier transactions, thus maintaining the integrity of the database.

Since it is desirable to use multiple archive devices in order to increase system throughput and thereby reduce backup time, several basic ways of meeting the above noted conditions are possible. The first approach is to ensure that all images of any page p always appear only within the volumes of a single stripe.

The second approach is to physically require the loading of all Phases 1 through P-1 before any later Phase P. Finally, the third approach is to keep track of page time stamps, which tell when a page has been created, in memory, in order to prevent overwriting a later image of a page with an older image of the same page.

By analyzing these options, it can be seen that the third approach, while functional, is not practical for large databases since large amounts of memory are required to keep track of the numerous page time stamps. For example, a one-terabyte database composed of two-kilobyte pages, each of which contains a four-byte time stamp, would require two gigabytes of main memory to store all the time stamps.

The second approach of physically requiring the loading of all Phases 1 through P-1 before any later Phase P, is also not optimal since in a situation where a set of dump volumes are loaded from fewer archive devices than were used at dump time, it is necessary to change volumes at each Phase boundary on the volumes so that all Phases 1 through P-1 are loaded before any Phase P. As noted, earlier, this is necessary because without such changes, a secondary Phase image of a restored page might be overwritten by a primary phase image from a subsequently loaded stripe volume, thus erroneously backdating that particular page in an unrecoverable manner. While this backdating may be overcome through manipulation by a backup operator, it is too inconvenient to require the user to manage this aspect of Phase ordering while performing backups.

Therefore, it has been determined that option 1 provides an optimal strategy for ensuring that for any Phase P where P is greater than 1 and any page p, all images of page p from Phases 1 through P-1 are loaded before any image from Phase P is loaded. This approach is named stripe affinity and is defined as the property that every image of a page in a database appears on exactly one stripe at dump time. Stated another way, the purpose of stripe affinity is to track the disposition of each page in the database or file system so that if a subsequent request comes in to dump a page (for example, in a later phase), the stripe affinity algorithm can determine on which stripe the page should be dumped. This property removes the volume changing associated with the second approach since all the images of any page follow each other physically, as well as chronologically, on the dump volumes of a stripe and so are automatically restored sequentially, in time order, resulting in the latest version of a page always being restored last. It also addresses the memory usage limitations associated with the third (time stamp) approach illustrated above. In other words, using stripe affinity every image of a page will appear on the same stripe and will always appear sequentially in forward time order. A pseudo code listing of a stripe affinity algorithm which may be used is provided in Appendix A of commonly-owned U.S. Pat. No. 5,515,502, issued May 7, 1996; the disclosure of the patent is hereby incorporated by reference.

Referring to the phases shown in FIG. 9, during a primary phase (or Phase 1 ) each dumped page is considered for a stripe affinity assignment once and only once. In addition, each dumped page is not seen in any preceding phase because under the invention a database disk piece may only be mapped to a single primary phase. Therefore, under the invention the Backup Server economically remembers the stripe to which a page is dumped by recording this information in a space efficient manner, using as little memory as possible, as well as in a manner which enables the Backup Server to access the information in a time efficient way. In order for this to take place, two primitive operations must be optimized for stripe affinity. These operations are (1 ) assigning a page seen for the first time to a stripe and remembering that assignment; and (2) determining the assignment of a page which may have been seen and previously assigned in a primary phase.

In order to meet these two goals, the Backup Server must have the ability to spread I/O requests across all database disks in parallel in order to make full use of the available I/O bandwidth. However, it is preferable that the actual assignments of pages to archive devices be limited to a granularity somewhat coarser than individual pages since it is desirable that the memory used to account for stripe assignments be kept small. In other words, it is desirable to store more than one page at a time on a particular stripe in order to reduce memory needed to reference stripe assignments, since the Backup Server is oriented towards backing up large databases. As such large databases grow, the memory needed to track stripe assignments grows as well, so it is important that the growth be controlled in a way that will not tend to exhaust the memory resources of the computing system performing the backup.

In the instant invention, pages are assigned a stripe affinity only during a primary dump phase or Phase 1. The pages may then be dumped in any order, but all the pages from a previous phase must be dumped before any page from the next phase is dumped. A similar rule applies for loads in that the pages in a phase may be loaded in any order, but all the pages from a previous phase must be loaded before any page from the next phase is loaded. Since in the dump sequence pages for later phases may arrive at the Backup Server before that phase has begun, the Backup Server must save these pages and dump them when the proper phase to which they belong begins.

In a preferred embodiment, phases are identified by number and later phases may have higher numbers than earlier phases. Phases are not nested; the previous phase must end before the next phase begins. Additionally, although the invention is described with respect to communications between the SQL Server and a Backup Server, the invention does not require two separate programs. Rather it is only required that some service provider perform the necessary functions. The agent and service provider may be as close as a subroutine call.

As noted earlier, when a dump has been requested, and before the initiation of the first phase, the SQL Server must inform the Backup Server of the pages mapped to each phase by issuing a series of calls to link each phase with those disk pieces from which it will dump pages.

Since these two types of phases, primary (corresponding to Phase 1) and secondary (corresponding to Phases 2 & 3) depend on the phase property bits which are set, in some cases the SQL Server may not send data for a primary phase. Instead, the Backup Server may drive its own transfer of all pages from a device given in a phase map for that phase to the archive device. Then, when the Backup Server has completed the transfer, it will return an acknowledgment for the completion of that phase.

Each secondary phase is bound to a single primary phase. A secondary phase contains run lists from the page mapping of its reference primary phase that refers to those pages which may have already been dumped during that particular primary phase. In other words, the pages identified in a secondary phase are referring to the same page maps as referred to by some of the pages dumped during that primary phase. As noted above, the purpose of a secondary phase is to compensate for those inconsistencies which occur in backing up a transactional database which remains on-line while the backup is taking place, by ensuring that the most recent version of each page is present in the dump so that these later versions of pages will be written to the database at load time.

In a preferred embodiment, each phase has properties which determine how pages are read from the database and then handled by the Backup Server. Since pages are assigned a stripe only during a primary dump phase, in one embodiment of the invention, if such a phase specifies that a BSYOUSCAN property is active, it indicates that the Backup Server should read allocation pages directly from the disk pieces specified in the phase map for that phase. Run lists are then constructed reflecting reserved (or written) and free (or empty) extents on the allocation page read in order to pass I/O service tasks for transfer.

In the preferred embodiment, pages are dumped and loaded by logical page number. The Backup Server has to map these logical pages into offsets in the files or devices which contain the database to backed up. This logical/physical mapping is defined by the SQL Server, but carried out by the Backup Server. This mapping is specified by a series of procedures known as as_$db$_$map$.

Each as_db_map procedure defines a disk piece which is a range of logical pages, a file or device name, and the offset in the file or device at which the range begins. The Backup Server then determines the physical location of a page in the database by subtracting the start of the range from the logical page number, adding the offset, and using that as a page number in the device.

Since the logical-to-physical mapping at the time of the dump may not match the mapping at the time of the load, the Backup Server uses the mapping provided by the as_db_map procedure at the time of the load no matter what the mapping was at the time of the dump. There may be any number of disk pieces defined by the database via as_db_map procedures, and the same device may be referenced in more than one as_db_map.

Figure 10A:
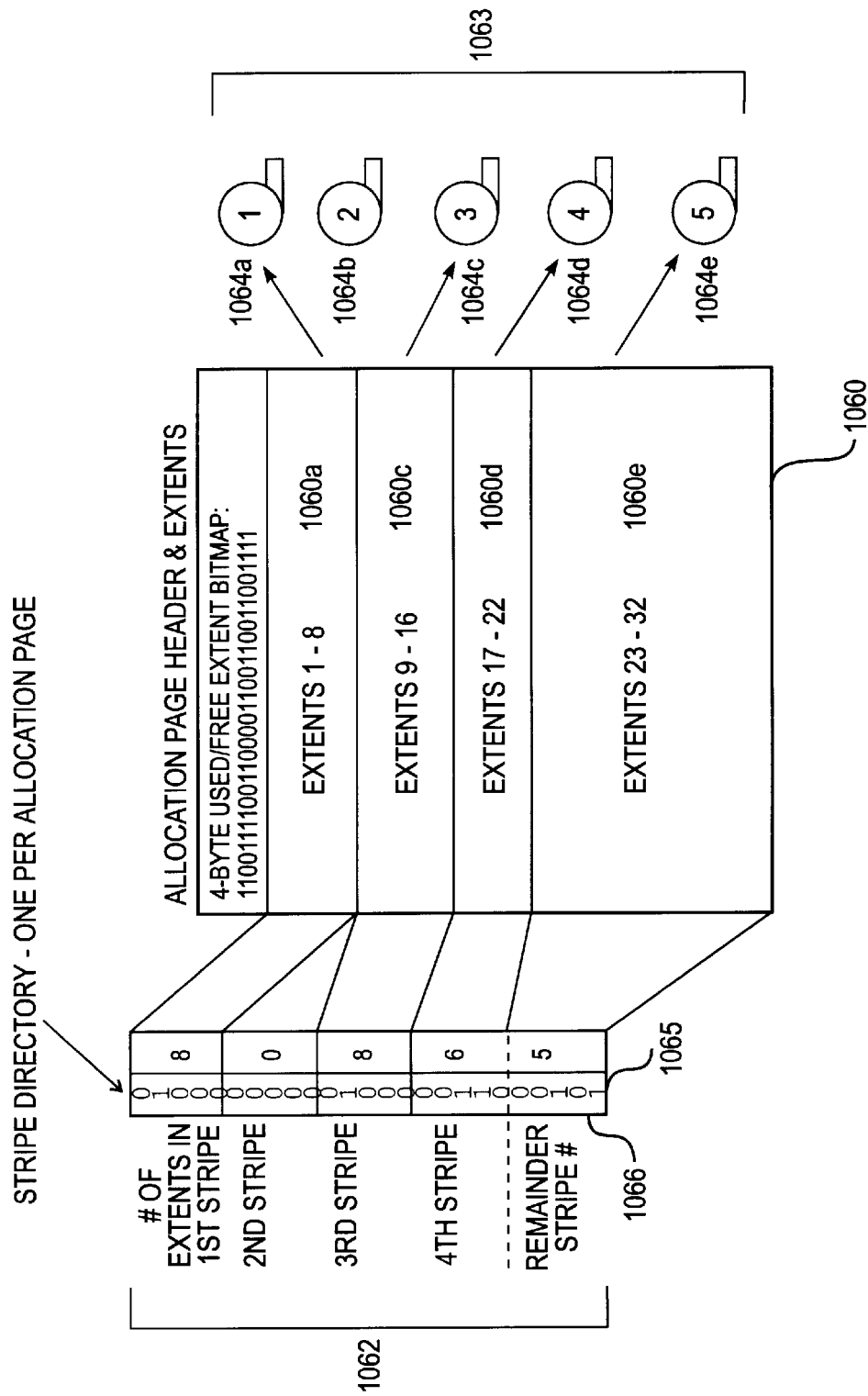
FIG. 10A is an illustration of a stripe directory based on the contents of an allocation page.
Figure 10B:
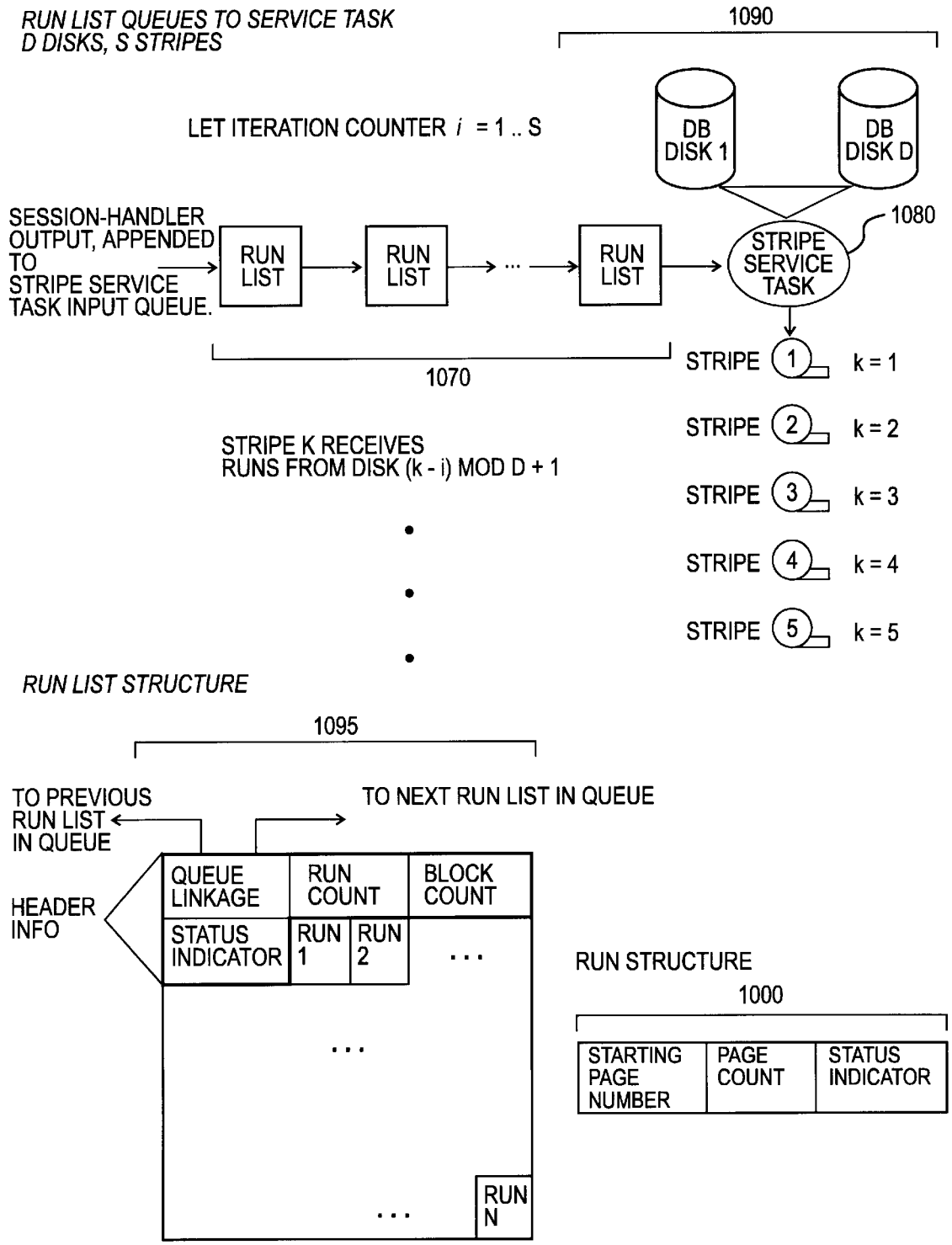
FIG. 10B is an illustration showing the interface between the Session Handler and the Service Tasks.
Figure 10C:
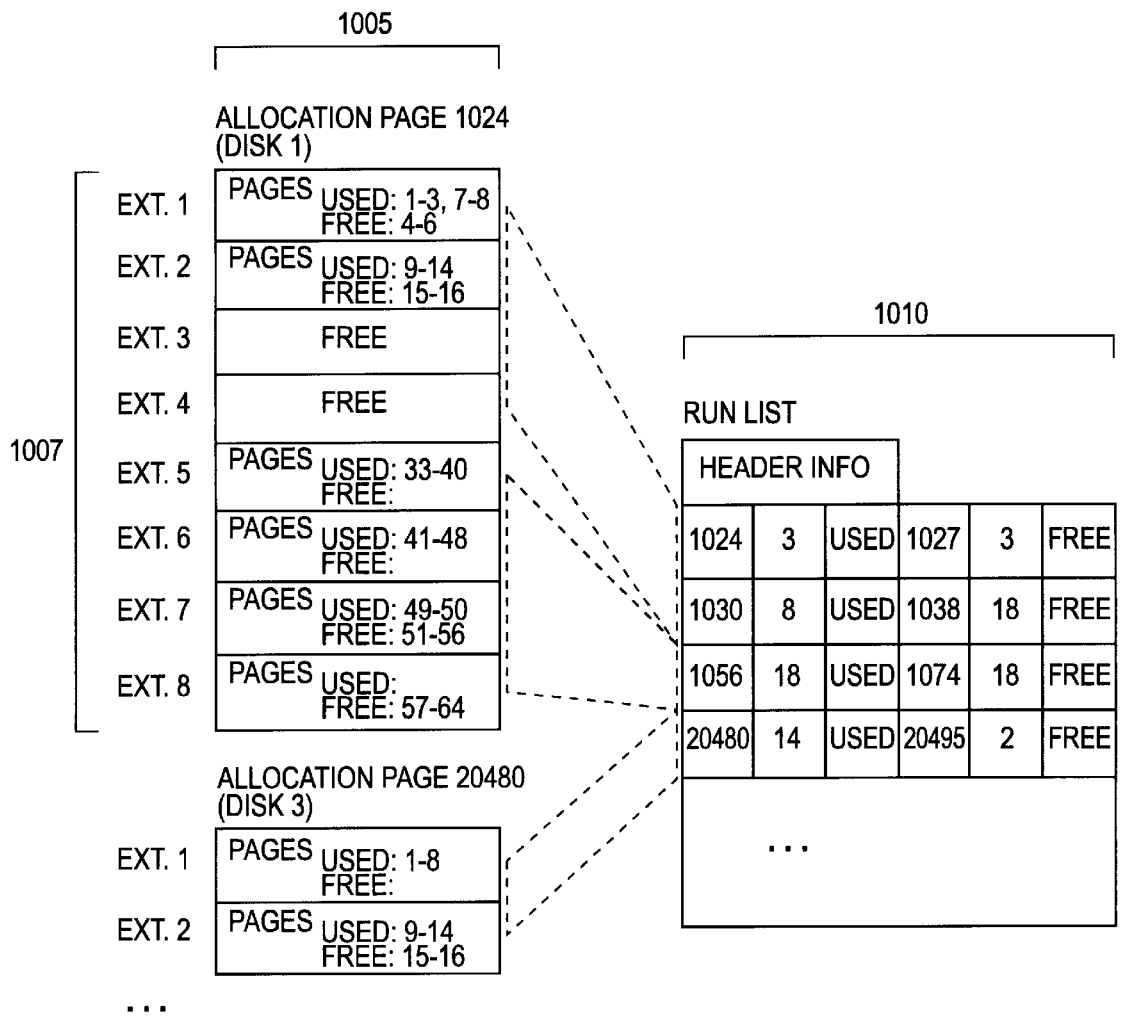
FIG. 10C is an illustration showing the assignment of extents to run lists depicted in FIG. 10A.

Referring next to FIGS. 10A, 10B and 10C, the determination of stripe assignments for each allocation page is shown. As illustrated, FIG. 10A shows the construction of a stripe directory based on the contents of an allocation page. FIG. 10B describes the interface between the Session Handler and the Service Tasks in greater detail. In FIG. 10B, the interface is a queue of Run List structures 1070. In operation the Session Handler produces Run Lists 1070 as its output and the Service Task 1080 takes the Run Lists as its input. FIG. 10B depicts the queue 1090, an expression of which disks have entries in the Run Lists in the queue for each stripe, the structure of a Run List 1095 and the structure of a Run 1000. These structures determine which blocks the Service Task backs up from the database disks to its archive device.

Finally, FIG. 10C illustrates in greater detail the mapping of assigned extents 1005 to Run Lists 1010. In FIG. 10C the contents of an extent group 1007 are represented in a Run List structure 1010, showing in particular how runs from multiple database disks can appear in one Run List.

Under the invention stripe assignments are made at the extent level, and no extent ever spans stripes. The use of dump striping allows N archive devices to be used in parallel to create an N-way striped dump. This means that a database may be split logically into N roughly equal sized portions and those portions dumped concurrently to N archive devices. The advantage of this architecture is that it reduces dump time by a factor proportional to N and may, in fact, obviate the need to change physical archive volumes during a backup session since the N archive devices may have enough capacity to hold their corresponding portions of the database on a single device and/or single volume.

For the purposes of the invention the set of devices utilized in a striped dump or load is called the stripe set. In a preferred embodiment, the maximum number of devices in the stripe set is 32. The system labels dump volumes per the ANSI tape labeling standard and each volume of the dump saves the ordinal number of the device in the stripe set as well as the logical volume number in the ANSI volume label. This information is then used at load time and in connection with the change of volumes to verify that volumes are mounted in the same order as they were at dump time so that the database is reconstructed consistently. This scheme also allows any combination of devices to be used at dump or load time and only constrains that volume ordering (that is, the order of media within a particular stripe) be the same at dump and load times. Most importantly, using this scheme it is possible to load from a smaller number of stripe devices than were used at dump time.

As noted above, stripe assignments are determined for each allocation page, accounted for at the extent level, and never permit an extent to span stripes. The mapping of assigned extents 1005 to run lists 1010 is shown in FIG. 10C. The stripe affinity provided in Appendix A of commonly-owned U.S. Pat. No. 5,515,502 analyzes the distribution of allocated extents in the allocation unit and assigns groups of extents (both free and reserved) in the allocation unit to individual stripes. In a preferred embodiment, a local 4 byte bit map variable is used to represent the used/free status for each of the 32 extents on any allocation page. This assignment decision attempts to balance the distribution of reserved extents across stripes evenly.

As seen in FIG. 10A, each allocation page has associated with it a stripe directory 1060. The stripe directory describes the distribution of extents in an allocation unit 1062 to the available stripes 1064a–1064e (1063). The stripe directory is represented as an array of variable width bytes followed by a remainder stripe byte 1065. Each byte corresponds positionally to a particular stripe and contains the number of extents which are assigned to that stripe. The extent counts accumulate up to a maximum of 32 since there are a maximum of 32 archive devices 1064 (FIG. 10A), and there are an array of such entries for each disk piece that is a part of a primary Phase. To ease the implementation on 8-bit-byte platforms, the stripe directory can be composed of an 8-bit remainder stripe number with 8-bit extent counts for 16 and fewer stripes, and 4-bit extent counts for 17–32 stripes. Under this concept the size of the directory elements does not change the algorithm for creating and accessing a stripe directory. Rather, using 4 or 8-bits simplifies the reading and writing of elements on most computers because a 5-bit value need not be extracted into 8-bits, and vice versa. This extraction work is the cost of using the most compact representation. On the other hand using the less-compact design saves on extraction time but uses more memory.

In the preferred embodiment, any extents not counted in the directory elements are then assigned to a remainder stripe 1066. The remainder stripe 1066 is simply a stripe to which are assigned all the extents not otherwise assigned to any other stripe. The purpose of the remainder stripe is to allow all of the extents in an allocation unit to be assigned to one stripe without requiring that each directory element be able to represent the maximum number of extents on any given allocation page. The remainder stripe field takes the place of the element in the directory because any extents not assigned to any other of the stripes must be assigned to a remaining stripe.

If a directory element contains 0, then no extents are assigned to the corresponding stripe. In this case the stripe affinity algorithm attempts to equalize the number of reserved extents assigned to each stripe, in order to load balance as much as possible. However, every extent, free or not, is assigned in the directory to some stripe. This allows assignment of subsequently allocated extents named in a reconciliation phase (such as Phase 2 or Phase 3) to a stripe without modifying the directory of that extent's allocation page.

Figure 12:
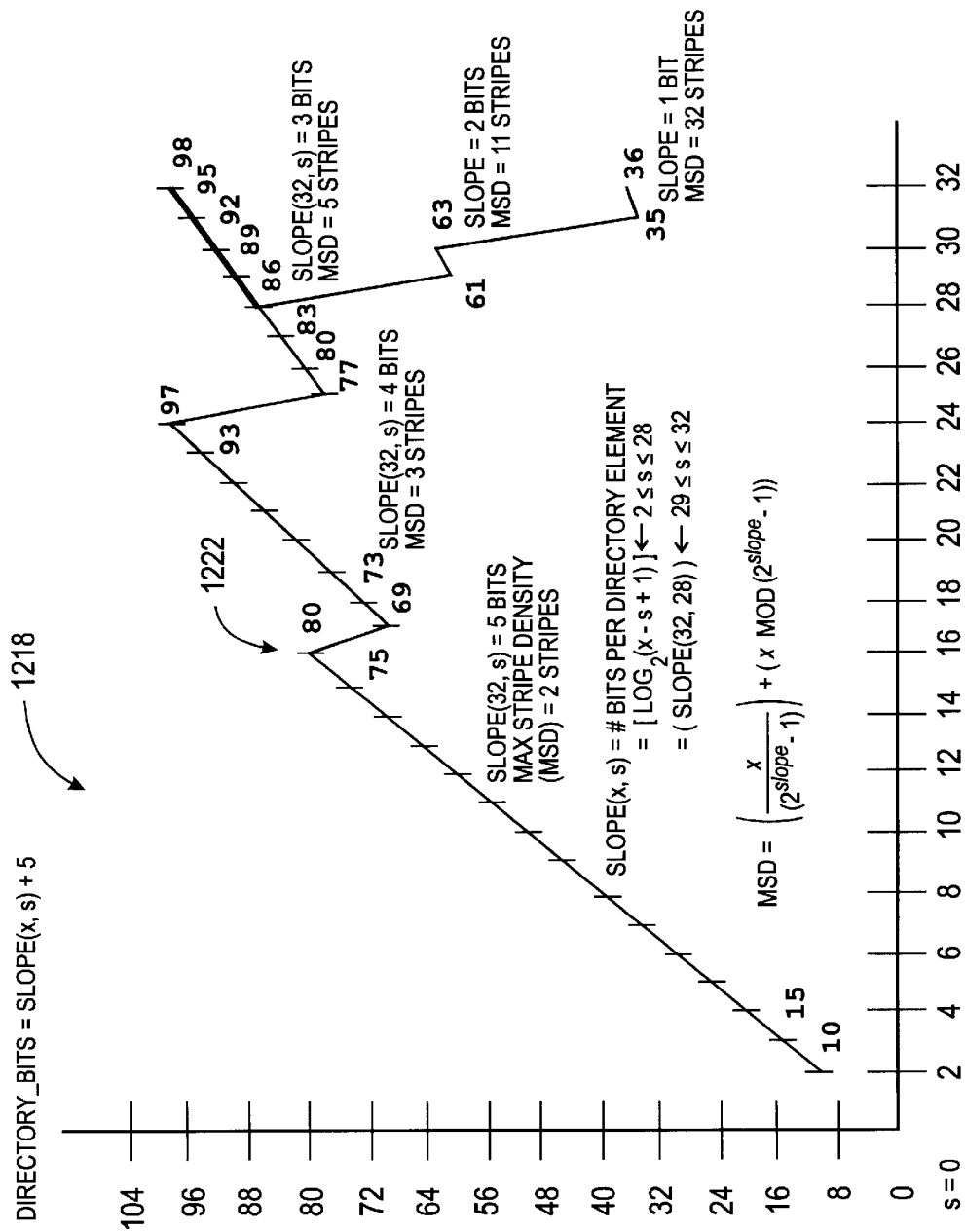
FIG. 12 is a graph illustrating the number of directory bits required to record stripe affinity for up to 32 stripes.

As noted, in a preferred embodiment the elements of the stripe directory are of a variable width with the width of the elements 1218 decreasing step-wise as the number of stripes 1222 increases. This property is shown in FIG. 12 and allows space and resource savings when representing stripe directories in memory. The decreasing element width reflects the fact that a decreasing number of bits are needed to represent the maximum number of free extents which may lie between reserved extents on an allocation page when at least one reserved extent is written to each stripe. This relationship may be shown by the proof that given a stripe set of size S, with X extents per allocation page, such that S is less than or equal to X, and given that at least one reserved extent is assigned to each stripe, it can be shown that maximum of (X−S+1) reserved or free extents can be assigned to any one stripe by showing that the stripe set is partitioned so that stripes [1,S−1] archive extents [1,S−1]. Stripe S then archives extents [S,X] and there are (X−S+1) extents in [S,X].

In one modification to the invention, the stripe assignment algorithm may be modified to include a factor based upon feedback information from I/O service tasks as a way of adapting the backup process to differences in the data transfer rates supported by the available archive devices.

Using the proof above noted to make an assignment to the stripes shown in FIG. 10A, it can be seen that stripe affinity is based on the I/O backlog which affects stripe 2 (1064b) with the result being that stripe 2 (1064b) is temporarily not available to archive data. In such a case where we have S stripes, and X extents, and where S=5 and X=32, we can use the equation of the $\log_2$ (x−S+1) is equal to the log base $\log_2$ (32−5+1) which is equal to the $\log_2$ (28) resulting in a stripe directory containing 5 bits per element times 4 stripe fields plus 5 bit remainder stripe field for a total of 25 bits in the stripe directory. This equation is generalized in the chart shown in FIG. 12.

As seen in FIG. 12, generally the greater the number of stripes 1222, the greater the number of directory bits 1218 which will be necessary. For example, if 5 bits are used to represent the number of extents which may be assigned to one stripe then we can assign 31 extents to one stripe. However, if we have 32 extents on an allocation page, we need to use another stripe to assign the remaining extent. This leads to a calculation known as maximum stripe density (msd), which is the minimum number of stripes which compose used if we make an assignment for every extent (as we must) with a minimum number of extents assigned to the remainder stripe. As shown if the number of stripes grows to 15 (1222) then 80 directory bits will be used. Therefore, in an attempt to make the stripe map smaller, it is possible to have a lower maximum stripe density in return for a smaller number of directory bits. In other words, FIG. 12 shows a manner of controlling the growth of the size of the stripe directory to a rate approximately logarithmic in relation to the growth of the number of stripes beyond 16.

As noted above, stripe assignment takes place during the primary phase or Phase 1. In a secondary phase, such as Phase 2 or Phase 3, the SQL Server sends run lists, and logical page number intervals to the Backup Server for archiving. Since this information is an update of information which has previously been stored on the archive devices, the Backup Server must be able to determine quickly the stripes on which the listed pages should be stored. Therefore, a basic optimization of the invention is to calculate stripes only for each whole or partial extent contained in the run list since an extent never spans more than one stripe.

Referring back to FIG. 10A, after fetching the stripe directory 1065 for the extents allocation page, the next step is to determine in which stripe (1060a–1060e) a given extent to be assigned falls. This is done by scanning across the elements of the stripe directory 1065, and summing the extent counts from each element. The element for which the accumulated extent count exceeds the given extent number is the stopping point of the scan. Then, the remainder stripe field 1066 is checked against the current element position. If the remainder stripe value is less than or equal to the current element number, then the assignment stripe will be 1+the current element number, otherwise, the assignment stripe is the current element number. If the element scan reaches the remainder stripe field 1066 without the accumulated extent count equaling or exceeding the given extent number, then the extent is assigned to the stripe given in the remainder stripe field 1066. For the stripe assignment example given in FIG. 10A, a page on extent 24 (1060e) would be assigned to stripe 5 (1064e), the remainder stripe, because the sum of the extent counts over the elements for stripes 1 through 4 is less than 24.

As indicated earlier, an object of the invention is to provide maximum concurrency or throughput between database I/O and the available archive devices. To reach this goal it has been determined that:

1. to provide load balancing of archive space usage, the concurrency strategy should attempt to place approximately equal amounts of data on each stripe;
2. to provide load balancing of time usage, (that is to prevent large imbalances of backlogged I/O requests across stripes), the concurrency strategy should utilize feedback so it can avoid sending pages to backlogged devices until the device clears its backlog;
3. to provide database disk concurrency, the concurrency strategy should arrange that as many reads as possible be issued to different database disks at any given instant, rather than reading each database disk sequentially; and
4. to avoid conflicts, archive devices should not "fight" with each other for disk access; that is, two archive devices should not be told to read from widely physically spaced locations on the same disk at the same time. Rather, successive I/O requests should be for blocks at, or a short distance ahead of, the current disk head seek position. In such an embodiment, the database disk arm ideally moves across the platters smoothly (ignoring ordinary database activity.)

The first objective is met through the use of the stripe affinity scheme of the invention because that scheme attempts to divide up allocated extents on an allocation page evenly across stripes. The second objective is met by the communication and assignment of I/O loads away from backlogged devices. Objectives 3 and 4 are met through the use of their own logic design.

Throughout the foregoing the term "Database Disk" or some variant is used. It is noted that these terms may be construed to mean a virtual disk; that is, disk entries for the database stored on a system device. More than one portion of a database can be resident on a virtual disk, and a virtual disk can contain portions of more than one database. In addition, disk pieces for the same virtual disk are grouped together and the disk pieces for a virtual disk then form a single stream of allocation pages. In practice, one stripe affinity directory array will be associated with one disk piece, since disk pieces on a virtual disk can correspond to widely separated intervals of logical pages. This scheme then yields maximum I/O concurrency when virtual disks map to distinct physical spindles with the result that concurrent virtual disk I/O's are physically parallelized.

In actual use it is not practical to guarantee that all the stripe archive devices will each read from a different disk whenever it is possible to do so, because the number of combinations of available disks with available stripes can easily become unmanageable even for small numbers of database disks and archive devices. Instead, a best effort approach is preferred so that during a primary stripe assignment phase, data transfers will be allocated to each archive stripe in sequence so that each stripe will tend to access a different disk from the others at a given instant.

Figure 11A:
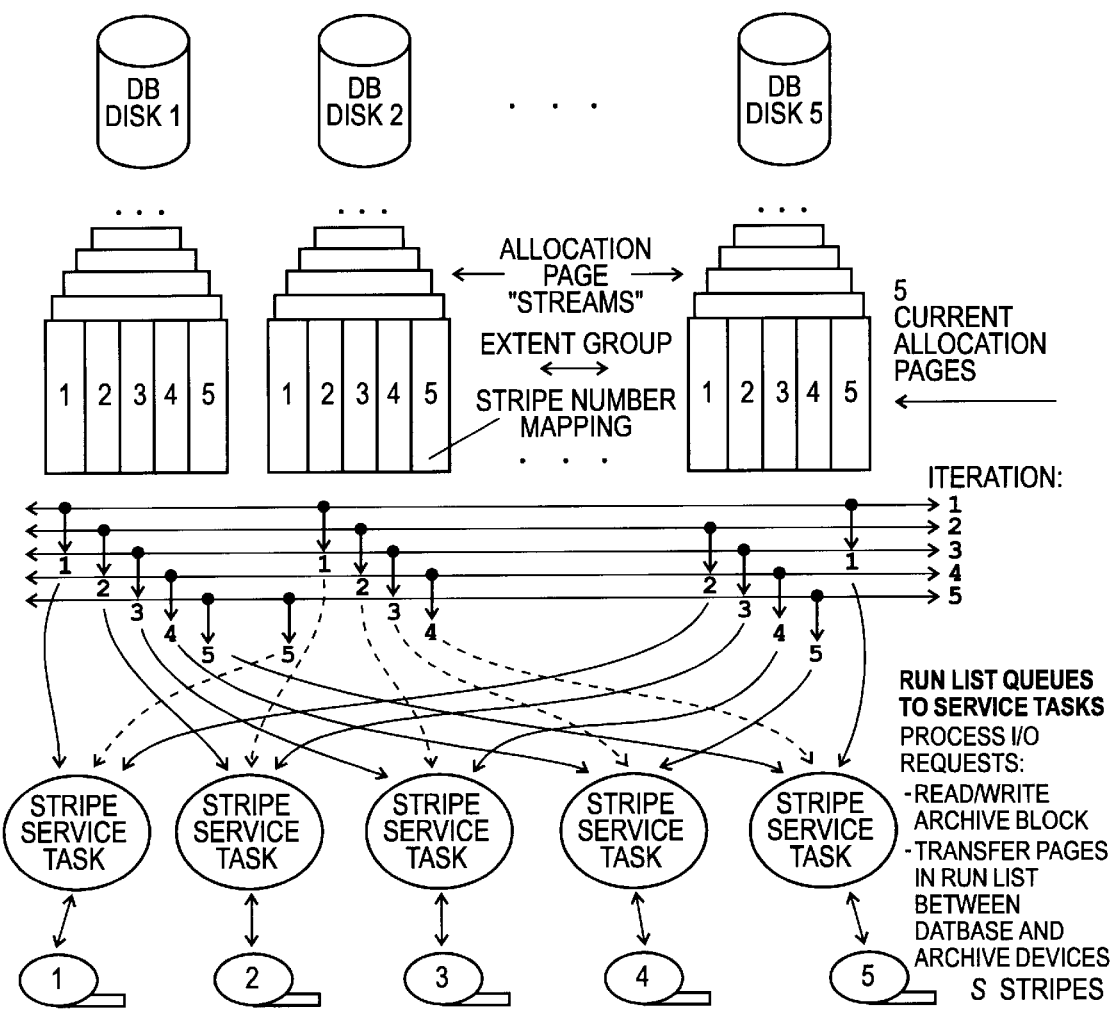
FIG. 11A is an illustration of the allocation of extent groups to stripes when the number of database disks being dumped is greater than or equals the number of stripes.

As seen in FIG. 11A, when there are at least as many disks as stripes, this is a straightforward process. The preferred embodiment follows the scheme depicted below, iterating over the extent groups until all the extents from all the current allocation pages have been sent via run lists to the stripe devices. These iterations are repeated until all the allocation pages from the target disks have been scanned. If there are any remaining disks, the next S disks are selected and the cycle begins again. For example, assuming 5 database disks and 5 stripe archive devices, in a first iteration extent 1 from database disk 1 is written to stripe 1; extent 2 from database disk 2 is written to stripe 2 . . . and extent 5 from database disk 5 is written to extent 5. Then on the second iteration, extent 2 from database disk 1 is written to stripe 2; extent 3 from database disk 2 is written to strip 3; and so on. In this way, extent group 1 from every database disk is always written to stripe 1; extent group 2 from every database disk is always written to stripe 2; etc. This ensures that maximum I/O concurrency can be maintained as the tasks are spread across the available database disks and stripes. It also ensures that extents are always written to the same stripe, which makes certain that data recorded later in time will be written after data recorded earlier in time and further that during restoration data will be provided in a proper time sequence order regardless of the number of archive devices used for restoration.

Figure 11B:
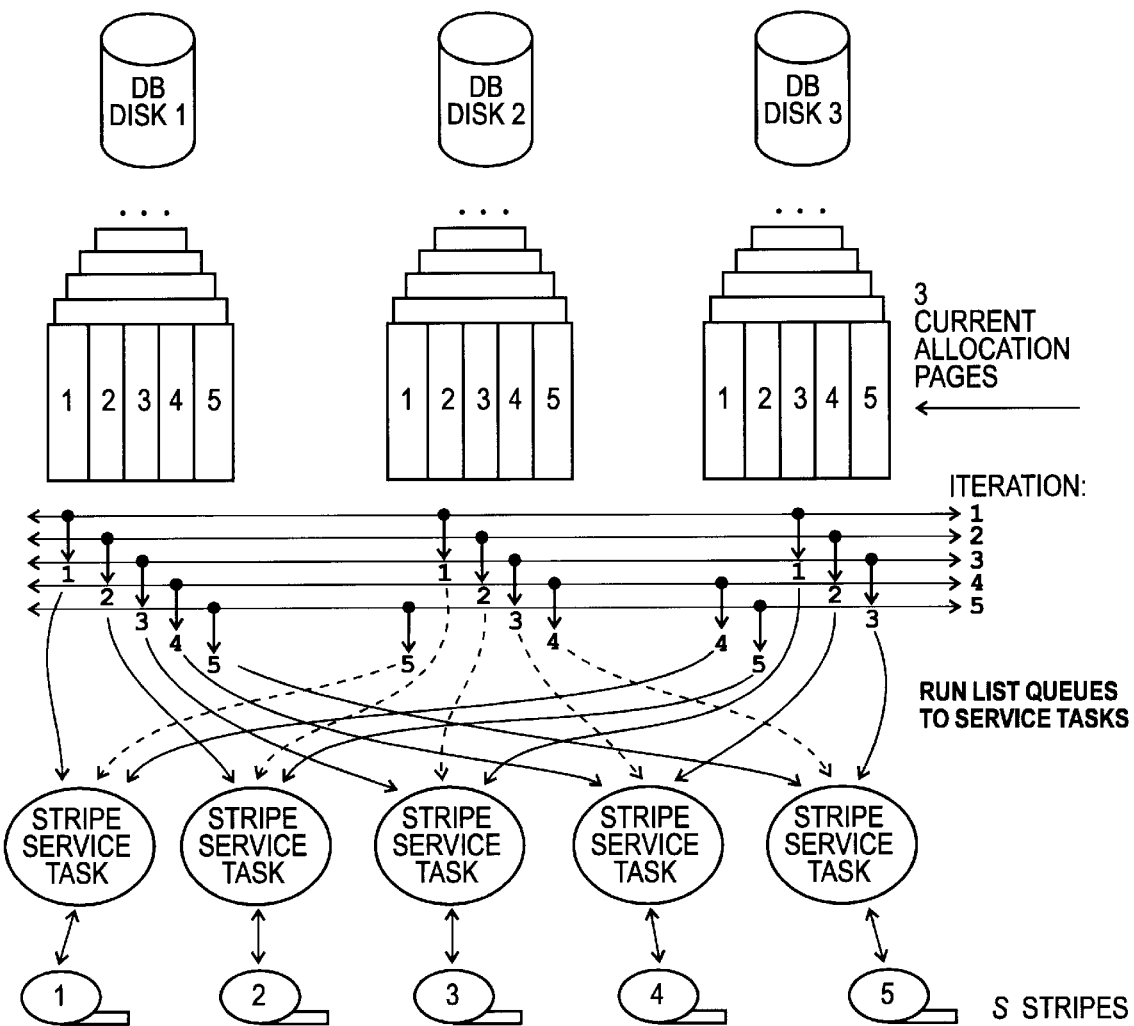
FIG. 11B is an illustration of the allocation of extent groups to stripes when the number of database disks is fewer than the number of stripes.

Referring to FIG. 11B, on the other hand, if there are fewer disks than stripes, either at the beginning or at the end of one or more iterations of the cycle described above, then the allocation scheme will still work as depicted except that database pieces will be passed only to D stripes per iteration (rather than S stripes per iteration). Since the passing of data may proceed much faster than the stripe device I/O, and the algorithm of the invention distributes data to different but mostly overlapping stripes during each iteration, the stripe devices will still tend to have I/O requests to all disks pending at one time. This, in turn, will tend to maximize concurrent disk activity as there will be fewer than the total number of stripes per request at each iteration. In a preferred embodiment, an incorporated task scheduler mechanism is used to allocate processor time among the tasks that comprise the backup system. In this way the I/O service tasks can process their event queues while the invention processes the current set of allocation pages. In general, the Backup Server will be able to sense the type of device that the archival device name represents. This backup logic removes the need for users to pre-specify device types or capabilities. The Backup Server is capable of determining the control method for devices given just the name, and popular supported devices include, but are not limited to, 8 mm tape, DAT, 9 track tape, streaming cartridges, disk files, raw foreign mounted disks, floppy discs or other removable disks as well as all of the preceding devices when accessed via a network.

As touched on above, a desirable effect of using a dump synchronization logic incorporating stripe affinity of the invention is that it simplifies the load logic used during restoration to a nearly trivial level. No phase synchronization is necessary during loading because of the stripe affinity property. Database disk I/O concurrency takes place automatically assuming similar mapping of logical pages to disks at dump and load times because the dump time logic tends to assign pages from different disks to different stripes. As a result of the calculations performed during dump time, there is little backup specific work to do at load time.

Figure 13:
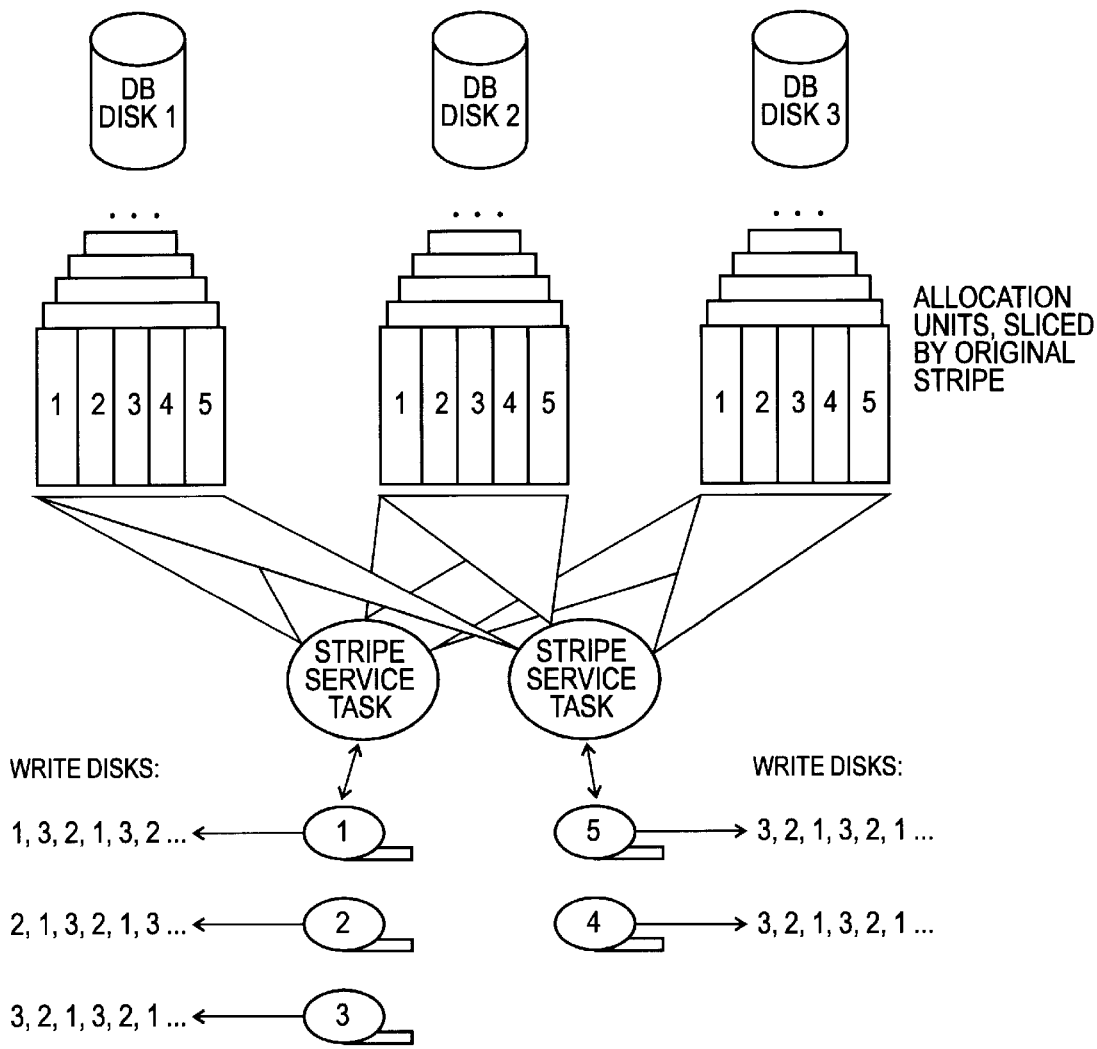
FIG. 13 is an illustration of the restoration of data from fewer archive devices than used during backup, in accordance with the instant invention.

Finally, referring to FIG. 13, an illustration depicting the restoration of data from fewer achive devices than used to perform a backup is shown. The "Write Disks" sequences show the approximate time sequence of access by each Service Task to the database disks. This restoration follows the backup illustrated in FIG. 11B. For example, stripe 1 will provide extent I from disk 1; then extent 1 from disk 3; then extent 1 from disk 2. Concurrently stripe 2 will provide extent 2 from disk 2; and then extent 2 from disk 1; then extent 2 from disk 3; and so on. Using this arrangement, data may be restored with good concurrency (that is, the Service Tasks will tend to access separate disks at each time step), and with fewer restoration archive devices.

In summary, then, through the teaching of the invention an improved data backup system is provided which is especially suited to the backup of information stored in a large transactional database. The backup system is capable of backing up data while the transactional database is still active, and is capable of utilizing multiple backup archive devices to increase the speed at which a backup takes place. Additionally, the information to be backed up is processed through a calculation to determine stripe affinity, a method for ensuring the integrity of the database backups made to multiple backup devices simultaneously, while also permitting the reloading of data from fewer devices than used to make the original backup.

Log deallocation

A. Introduction

Log deallocation is the process of freeing up that portion of a transaction log which no longer tracks active transactions. A log deallocation typically occurs in the context of a DUMP TRANSACTION command. In Sybase SQL Server, for instance, a DUMP TRANSACTION command is principally a command to archive part of the log, specifically the "unused" portion of the log. Variant forms of the DUMP TRANSACTION command exist, largely for the purpose of truncating the log. An alternative form, DUMP TRANSACTION WITH TRUNCATE_ONLY, for instance, serves to only perform the truncation part. Here, there is no effort to archive the deallocated portion to tape. In general, however, the main DUMP TRANSACTION command serves to archive the unused portion of the log, typically to a tape device, and then deallocates that unused portion of the log.

The task of allocation and deallocation of pages in a database largely involves tracking which pages (uniform storage units) are employed. In the particular instance of the log, pages are grouped together into another uniform storage unit, a "segment." A segment simply serves as a mechanism for keeping together certain pages. By keeping track of which pages are used (and which ones are not used), the system can optimize space management.

In SQL database servers, there is a fairly standardized mechanism whereby transactions write log records to the log. There is, however, no such standardized mechanism for deleting log records from a log. Since SQL standards do not specify such a mechanism, each database vendor has implemented this functionality in its own proprietary manner. In the instance of Sybase SQL Server, for instance, this is done by deallocating log pages.

B. Log deallocation process

Figure 14:
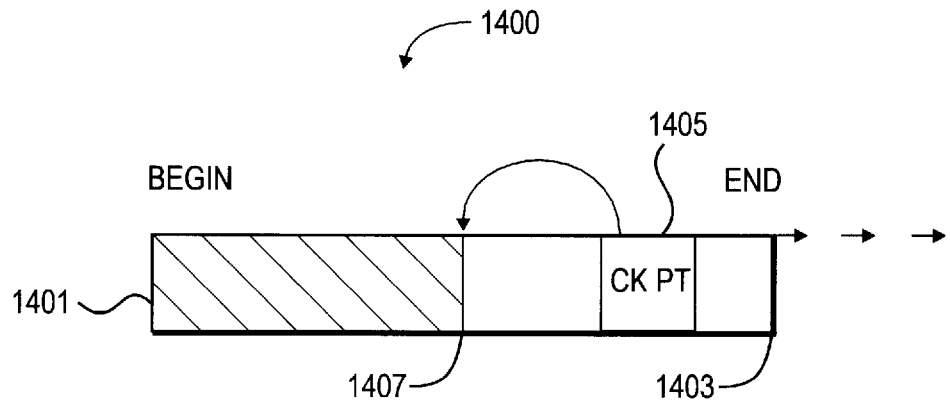
FIG. 14 is a block diagram illustrating diagrammatically how a log file is deallocated in the system of the present invention.

FIG. 14 illustrates diagrammatically how a log file is deallocated. For log 1400, there exists a beginning of the log 1401 and a current end of the log 1403. In an active system, the current end of the log is continually changing as the log file grows. At various points in the log 1400, checkpoint records are inserted, such as checkpoint record 1405. The checkpoint record points back in the log to the oldest active transaction (log record), such as indicated at 1407. Therefore, the portion of the log which is currently in use exists between the current end of the log and that part of the log pointed to by the checkpoint record. Here, the unused portion of the log exists from the beginning of the log to where the checkpoint record points to, as indicated by hatching. When a new DUMP TRANSACTION command is executed, the system inserts a new checkpoint record.

In Sybase SQL Server, when parts of the log are deallocated, the system logs a record describing that deallocation. In other words, the deallocation itself is a logged event or transaction. If the command fails or is interrupted, the log truncation will be undone. When the deallocation is complete, the transaction will commit and a commit record will be written for the transaction; at this point, the deallocation will be made permanent.

C. Improved log deallocation in system having a backup server

Figure 15:
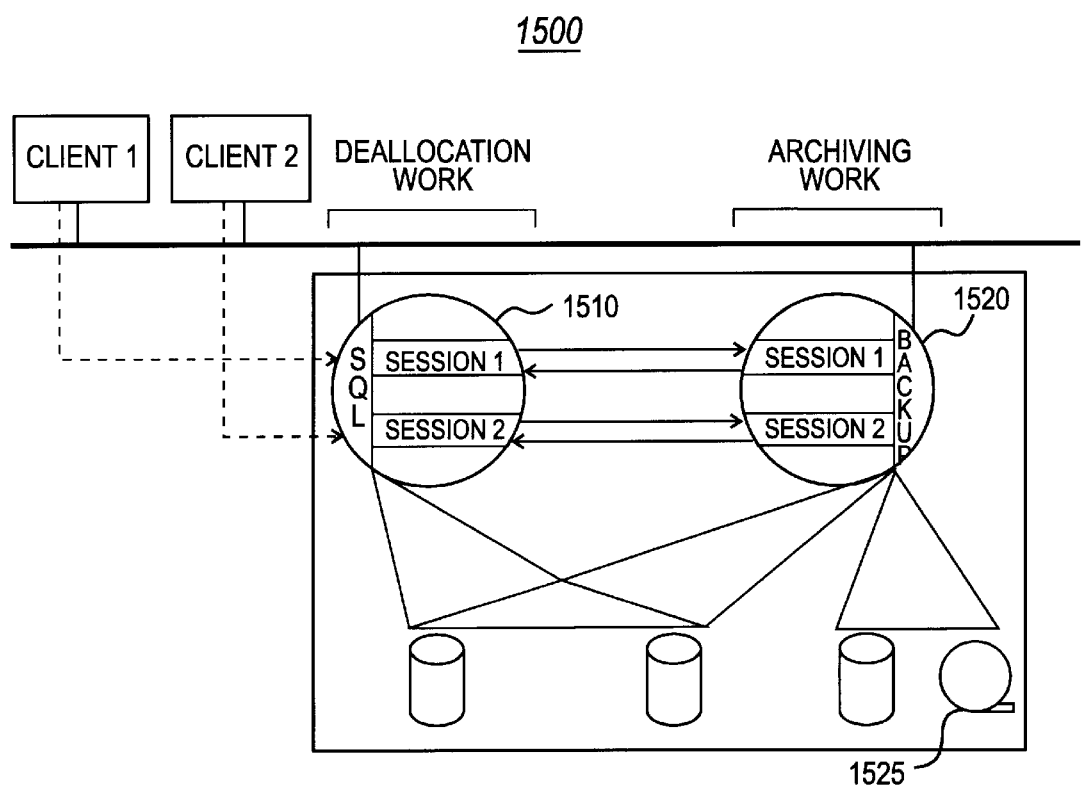
FIG. 15 is a block diagram illustrating division of labor for log file deallocation, for the system previously illustrated in FIG. 8.

In one configuration of a database system, the above-described "Backup Server" may be employed in combination with an SQL database server. FIG. 15 illustrates a SQL database server system 1500 comprising both a SQL database server component 1510 and a backup server component 1520. In such a system, the "archiving" part of a DUMP TRANSACTION command is done by the backup server 1520. Here, the backup server 1520 copies the information which is in the log to an archive device (e.g., tape drive). The "deallocation" part of the command is performed by the SQL database server 1510 deallocating particular log pages.

Figure 16:
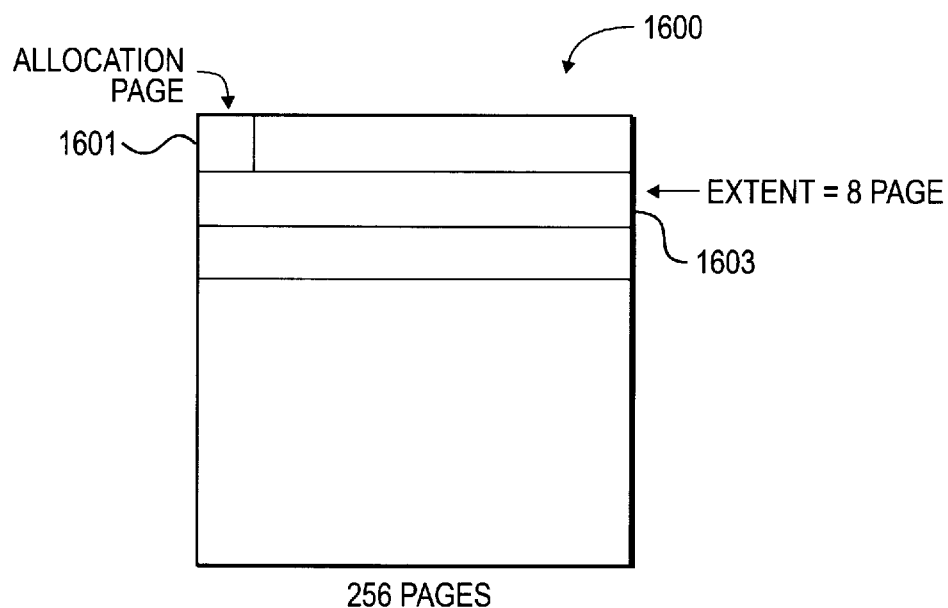
FIG. 16 is a block diagram illustrating an "allocation unit" for storing a plurality of pages, including log pages.

In the specific commercial embodiment of Sybase SQL Server, this task is carried out as follows. The SQL database server 1510 sends a "run list" of pages to the backup server. Since the log pages, like data pages, are divided up into allocation units, the run list represents a portion or whole of an allocation unit, such as allocation unit 1600 illustrated in FIG. 16. In the exemplary embodiment of SQL Server, an allocation unit comprises 256 pages. Of that unit, one page is designated as an "allocation page" (of that unit), such as allocation page 1601. The allocation page itself stores information describing which pages of the allocation unit had been allocated and deallocated.

Each allocation unit can be further divided into extents, such as extent 1603. Extents, each which typically comprises eight pages, map to different objects. Within a data segment of a database, therefore, extents can map to different objects. Here, each extent is associated with no more than one object.

If residing on a shared data and log segment, the run of pages to be deallocated will be an extent or part of an extent. For a dedicated log segment (e.g., in a production database), the allocation is more serial; the run in such an instance can be as large as an allocation unit.

Figure 17:
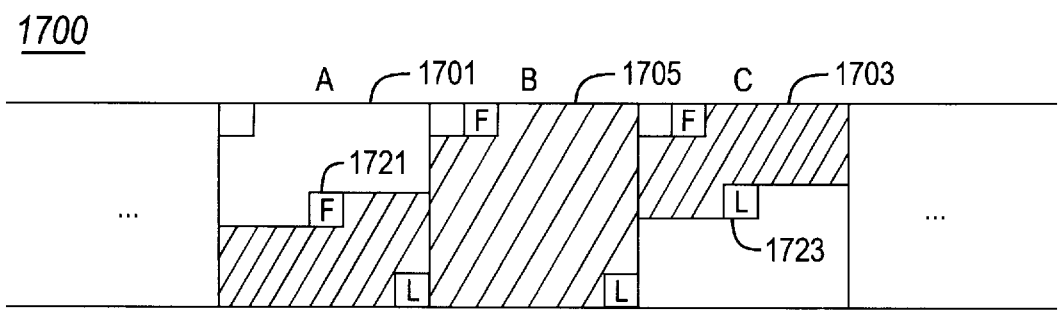
FIG. 17 is a block diagram illustrating run time storage of log pages using a plurality of allocation units, where some of the allocation units are fully allocated for the log.

Consider the allocation units 1700 illustrated in FIG. 17. The largest run which can exist occurs when an allocation unit is fully allocated for the log, such as shown at 1705. Here, 255 pages would be deallocated. In a production system, it is common to have many allocation units such as allocation unit 1705. In addition to these, however, there typically exists an allocation unit at the beginning which is partially filled, such as allocation unit 1701. Additionally, there typically exists an allocation unit at the end which is partially filled, such as allocation unit 1703. The common case in a production database system is to have a large number of 255-page runs, such as for allocation unit 1705. Each allocation unit itself represents a unit of work for the backup server to archive.

In prior versions of Sybase SQL Server, such as System 10, the deallocation part of the DUMP TRANSACTION work is done one page at a time within each allocation unit, by the SQL database server. In System 10, for each log page to be deallocated, the page must be read. This is required since the log record contains the page header (of the page being deallocated). In System 10, therefore, to deallocate a particular allocation unit, the system would read each page of the part of the log to be deallocated. For each page, the system would write a log record which describes the deallocation of that page. As a result, many pages of the log are read and many log records are written. In the common case of an allocation unit such as unit 1705, for instance, the system would read all 255 pages and write 255 log records.

According to the present invention, this methodology is modified such that the system no longer needs to read each of the log pages. Instead, the system now reads the first page and the last page of the run. For allocation unit 1705, for instance, the system would read first page 1721 and last page 1723. According to the present invention, therefore, the operation to do the deallocation occurs at the allocation page, not at the individual pages (which are to be deallocated). In accordance with this method, the system writes a log record which includes the first page and the last page of the run (i.e., the number of those pages). A new log record type—LOGDEALLOC—is provided by the system for this purpose. This new log record is associated with information describing the first and last page of a run. The system need not, however, read any of the pages of the run, other than the first page and the last page. In a common case of a completely filled allocation unit, such as allocation unit 1705, the system reads two pages—the first page and the last page—and writes one log record. As a result, the system reads far fewer log pages and writes but a single log record. In the instance where an allocation unit is not completely filled, the method is instead adapted to deallocate an extent at a time, thus still reading fewer pages and writing fewer log records. Here, the system reads two pages of the extent and writes a single log record. In prior approaches, in contrast, a database system would have read all eight pages of the extent and written eight log records for describing deallocation of each those pages. The approach of the present invention is particularly advantageous in a multi-user environment where writing numerous log records leads to increased contention for the system log, a shared resource.

Figure 18:
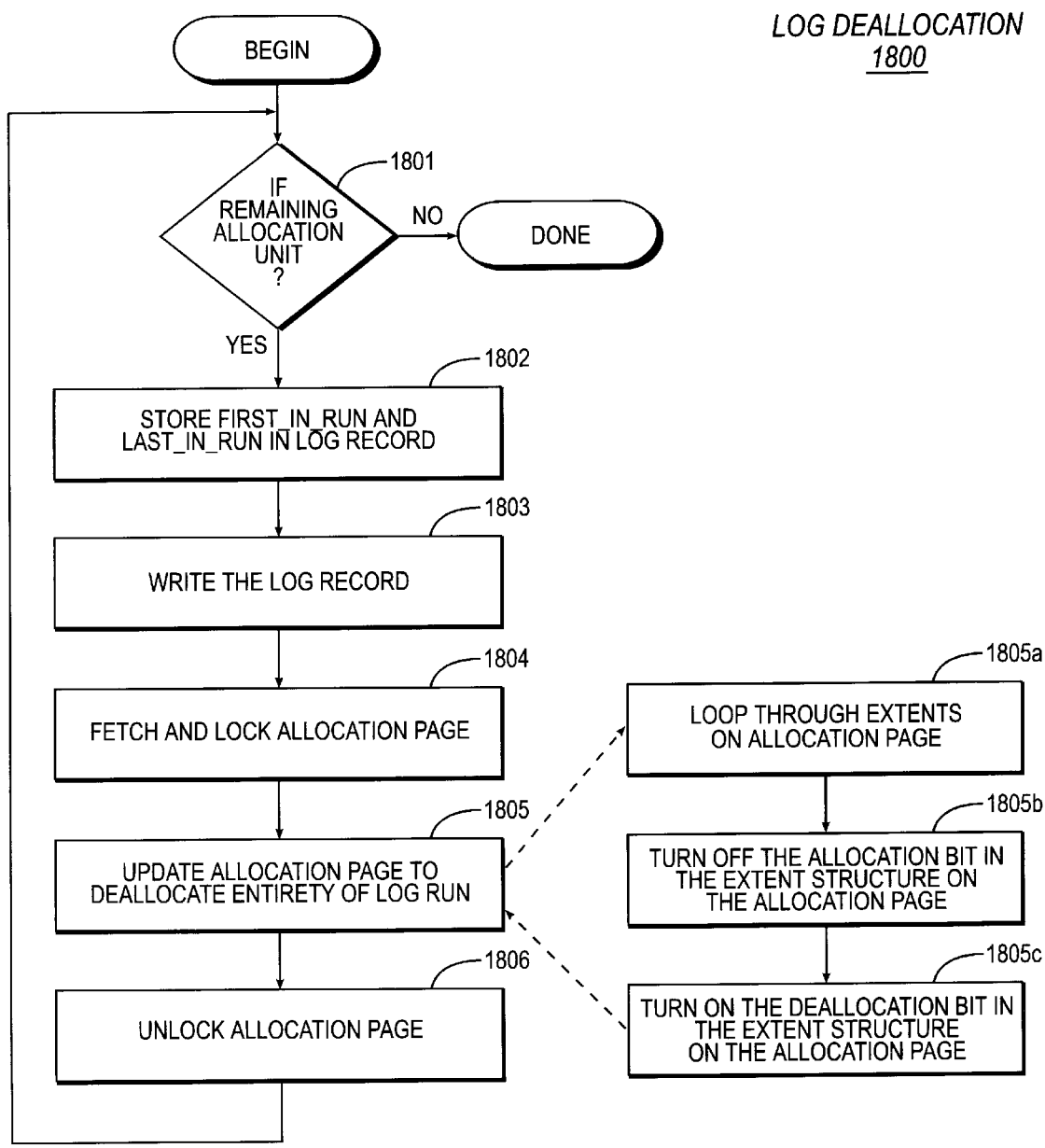
FIG. 18 is a flow chart illustrating a method of the present invention for log deallocation, which includes method steps for deallocating log pages without requiring fetching of those individual pages.

A method of the present invention for log deallocation is summarized by flow chart 1800, shown in FIG. 18. At step 1801, a loop is established to loop through all allocation units containing log pages to be deallocated. When no more allocation units remain, the method is done and may terminate. At step 1802, the method stores the first and last page IDs in the log record, for those log pages to be deallocated; at step 1803, the log record is written. Steps 1804–1806 represent method steps for processing each allocation unit; these will now be described in further detail.

At step 1804, the method fetches and locks the allocation page for the current allocation unit under exam. At step 1805, the method updates the allocation page to deallocate the entirety of the log run (for that allocation unit). The method loops through the extents in the allocation page, as indicated at step 1805a. For each extent, this includes turning off the allocation bits in the extent structure on the allocation page corresponding to the pages to be deallocated, as shown at step 1805b. The method step 1805 also includes turning on the deallocation bit in the extent structure on the allocation page, as shown at step 1805c. Finally, the allocation page for the current allocation unit under exam is unlocked, at step 1806. The method loops back to step 1801 for any remaining allocation units; otherwise, all allocation units have been processed and the method is done.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a database system, said database system maintaining a log for recording transactions which occur in said system, an improved method for deallocating log pages during archiving of the log, the method comprising:

storing information about the transactions which occur in the system as a plurality of log records, said log records being stored together on a plurality of log pages, a number of said log pages being stored together as an allocation unit;

receiving a request to dump certain ones of said log records to an archive device;

determining which allocation units stores said certain ones of said log records to archive;

for said determined allocation units, determining first and last log pages for said certain ones of said log records to be dumped to the archive device; and for each allocation unit determine to store said certain ones of said log records, deallocating log pages by at least performing:

if an allocation unit is completely filled with log records to be deallocated, deallocating those log records by marking the allocation unit as having deallocated log pages, the step being performed without fetching any log pages for the allocation unit.

2. The method of claim 1, further comprising:

before deallocating said certain ones of the log records, storing a new log record indicating said first and last log pages to be deallocated.

3. The method of claim 1, wherein said log records are stored sequentially by the system.

4. The method of claim 1, wherein each allocation unit stores an allocation page together with a plurality of log pages.

5. The method of claim 4, wherein each allocation unit stores 255 log pages.

6. The method of claim 4, wherein each allocation page stores flags indicating which log pages of the corresponding allocation unit are deallocated.

7. The method of claim 6, wherein said step of deallocating includes:

resetting the flag on an allocation page for indicating deallocation of corresponding log pages for a particular allocation unit.

8. The method of claim 1, wherein said request to dump certain ones of said log records comprises an SQL "dump" command.

9. The method of claim 1, wherein said certain ones of said log records comprise those log records storing information about transactions which are no longer active in the system.

10. The method of claim 1, wherein the log pages for each allocation unit are further grouped into extent groups, and wherein said deallocating step includes resetting a flag in a corresponding allocation page for indicating that a particular extent group is deallocated.

11. The method of claim 1, further comprising:

placing a lock on an allocation page for performing said deallocating step while protecting said allocation page from change by another process.

12. The method of claim 11, further comprising:

releasing said lock upon completing said deallocating step.

13. The method of claim 1, wherein said information about transactions comprises information indicating modification of data stored by the database system.

14. The method of claim 1, further comprising:

linking said allocation units together to form a chain of allocation units storing logging information for the system.

15. The method of claim 1, wherein the system inserts a checkpoint record into the log for indicating an oldest active log record, and wherein said log is dumped to archive at a point before said oldest active log record.

* * * * *